United States Patent [19]
Jennyc

[11] Patent Number: 5,579,459
[45] Date of Patent: Nov. 26, 1996

[54] METHOD FOR CLIPPING A LINE SEGMENT AGAINST AN ARBITRARY POLYGON IN THE FLOATING POINT DOMAIN

[75] Inventor: Kenn Jennyc, Calgary, Canada

[73] Assignee: Hewlett-Packard Co., Palo Alto, Calif.

[21] Appl. No.: 401,590

[22] Filed: Mar. 9, 1995

[51] Int. Cl.$^6$ ........................................ G06T 15/30
[52] U.S. Cl. ........................ 395/134; 395/133; 395/121
[58] Field of Search ..................... 395/119–122, 126, 395/133, 134, 135, 137

[56] References Cited

U.S. PATENT DOCUMENTS

| | | | |
|---|---|---|---|
| 5,129,051 | 7/1992 | Cain | 395/133 |
| 5,299,298 | 3/1994 | Elmquist et al. | 395/121 |
| 5,321,622 | 6/1994 | Snead et al. | 364/474.24 |
| 5,418,897 | 5/1995 | Capri et al. | 395/134 |
| 5,448,688 | 9/1995 | Hemingway | 395/141 |

OTHER PUBLICATIONS

Foley et al., *Computer Graphics: Principles and Practice*, 1993, pp. 124–127.

Primary Examiner—Heather R. Herndon
Assistant Examiner—Stephen Hong

[57] ABSTRACT

A system and method for clipping a line segment against a polygon performs all operations in the floating point domain. The line segment and the polygon are represented as Cartesian coordinates in a coordinate frame. The line segment and the polygon are first rotated about an arbitrary point in such a way so that the rotated line segment becomes parallel with an axis of the coordinate frame. Polygon clipping is performed in the floating point domain on the rotated line segment and polygon to obtain a rotated clipped line segment. The rotated clipped line segment is rotated back about the same arbitrary point to its original orientation with respect to the coordinate frame resulting in a desired clipped line segment.

9 Claims, 22 Drawing Sheets

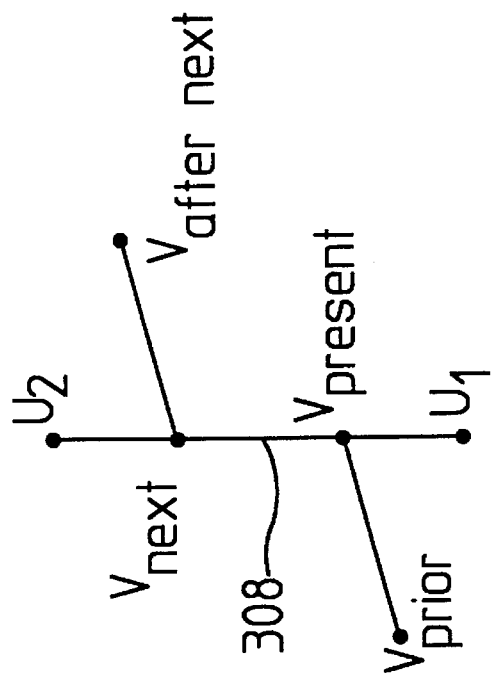
FIG 21C
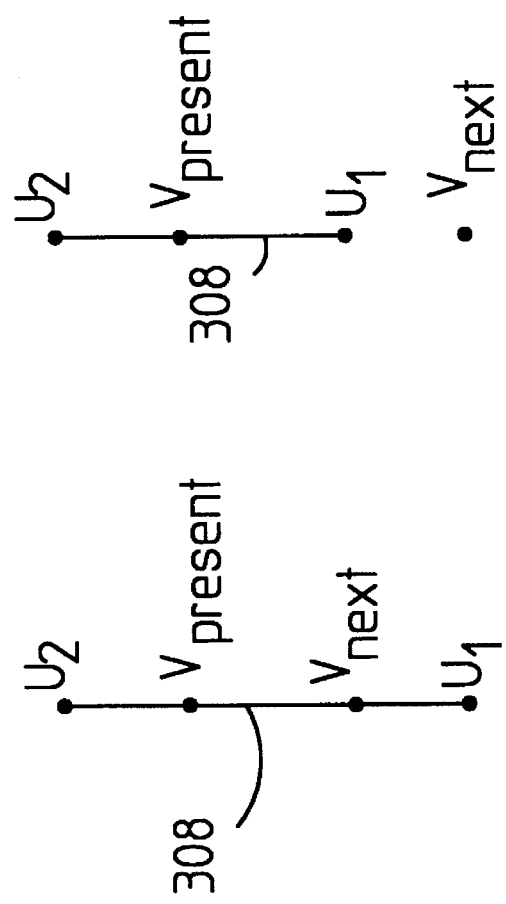
FIG 21B
FIG 21A

METHOD FOR CLIPPING A LINE SEGMENT AGAINST AN ARBITRARY POLYGON IN THE FLOATING POINT DOMAIN

BACKGROUND OF THE INVENTION

1. Field of the Invention

The present invention relates generally to computer generated graphics, and more particularly, to clipping line segments against arbitrarily shaped polygons.

2. Related Art

Clipping a line segment against a polygon is necessary in the field of computer graphics. Clipping is required when a line segment intersects a polygon in order to display both the line and the polygon. Clipping is required, for example, when a polygon is filled with a cross-hatch pattern. In this example, each line in the cross-hatch pattern comprises an independent line segment which must be clipped to the inside of the polygon.

Computer graphics routines display line segments using the end points. Accordingly, a line segment is defined by its end points as opposed to each individual pixel displaying the line segment. When a polygon is overlaid on the line segment, the line segment may be totally visible, totally covered, or partially covered. In the partially covered case where one end point is visible and one end point is covered by the polygon, clipping must be performed to determine a new end point to temporarily replace the covered end point. This new end point is determined as the intersection of the line segment with the polygon. The new end point, or intersection point, defines the transition between the visible line segment (i.e., the line segment between the visible end point and the intersection point) and the clipped line segment (i.e., the line segment between the intersection point and the covered end point). This allows a computer graphics routine to properly display a line segment between the visible end point and the intersection point.

FIG. 1A illustrates several examples of where clipping a line segment is necessary to properly display overlaid items. A display 18 is a computer graphics display capable of displaying computer graphics. Displayed on display 18 are a background window 120, a foreground window 130, a triangle 140 (actually shown as a trapezoid) displayed in foreground window 130, and a star 150, filled with a cross-hatch pattern 180. FIG. 1A highlights and is used to define, several aspects of clipping a line segment against a polygon.

Star 150 will be used to define several temps. FIG. 1B illustrates star 150 in an enlarged view. Star 150 is formed by ten line segments 151–160. Each line segment 151–160 has two end points (not numbered). A line segment 151 intersects a line segment 152 at one of the respective end points of each line segment. This intersection is defined as a vertex 162. The end points comprising vertex 162 are also referred to as being coincident. Star 150, or any polygon, is defined in terms of the location of its vertices. Star 150 has ten vertices 161–170 each located at coincident end points of two of line segments 151–160.

When defining star 150, the order of vertices 161–170 is important because a computer graphics routine connects the vertices in the order in which they are presented to form the polygon. The order of the vertices begins with a starting vertex, followed by a next vertex, which may be followed by several more next vertices until a last vertex. Each vertex sequentially defines the perimeter of star 150. For example, vertex 161 is arbitrarily chosen as a first vertex. A next vertex is chosen as vertex 162. Several more next vertices are chosen in order along the perimeter of star 150 as vertex 163, vertex 164, vertex 165, vertex 166, and so forth, until a last vertex is chosen as vertex 170.

A computer graphics routine typically draws a line segment between each vertex beginning at the first vertex to a next vertex (e.g., vertex 161 to vertex 162 forming line segment 151) and proceeding to each subsequent next vertex following the order of the vertices 162–170. After drawing a line segment to the last vertex (e.g., vertex 169 to vertex 170 forming line segment 159), the graphics routine draws a final line segment (e.g., line segment 160) between the last vertex and the first vertex (e.g., vertex 170 to vertex 161 forming line segment 160) to complete the perimeter of star 150.

A present vertex is defined as the current vertex of interest or the vertex presently being examined. Relative to the present vertex are several other vertices which are defined in terms of the present vertex. A vertex immediately prior to the present vertex is referred to as a prior vertex. For example vertex 161 is a prior index with respect to vertex 162. A vertex immediately after the present vertex is referred to as a next vertex. For example, vertex 162 is a next vertex with respect to vertex 161. With respect to the first vertex, the last vertex is the prior vertex. For example, vertex 170 is a prior vertex with respect to vertex 161. With respect to the last vertex, the first vertex is the next vertex. For example, vertex 161 is a next vertex with respect to vertex 170.

Star 150 is referred to as a concave polygon. Concave polygons are defined as having at least one interior angle greater than 180 degrees. For example, the angle between line segment 155 and line segment 156 when measured through the interior of star 150 is greater than 180 degrees. All other polygons are convex polygons having interior angles less than 180 degrees. For example, background window 120, foreground window 130, and triangle 140 are all convex polygons.

Determination of whether a polygon is convex or concave can be important. This is best introduced by example. A line segment can intersect a convex polygon at a maximum of two locations. In contrast, a line segment can intersect a concave polygon at two or more locations. Referring to FIG. 1A, for example, line segment 131 (shown as line segments 131A, 131B, and 131C) intersects star 150 at four different locations. Specifically, line segment 131 intersects line segment 156, line segment 157, line segment 158, and line segment 159. Thus, a clipping algorithm must be able to distinguish between convex and concave polygons, or be able to handle clipping regardless of the polygon's concavity.

Foreground window 130 is comprised of four line segments 131–134. Background window 120 is comprised of four line segments 121–124. Foreground window 130 is overlaid on top of background window 120. As a result, line segment 122 (shown as line segment 122A and 122B) of background window 120 must be clipped in order to properly display foreground window 130 because a portion of line segment 122 lies beneath foreground window 130. This particular clip is referred to as an exterior clip because line segment 122 is clipped against window 130 to obtain those segments that lie outside window 130 as defined by its edges.

Triangle 140 is comprised of three line segments 141–143. Triangle 140 is displayed inside foreground window 130. Both line segment 141 and line segment 143 are clipped against foreground window 130. The result is that triangle 140 appears as a trapezoid inside foreground window 130. This is referred to as an interior clip because line segment 141 and 143 are clipped against window 130 to obtain those segments that lie inside window 130 as defined by its edges.

Star 150 is displayed on top of both background window 120 and foreground window 130. Line segment 131 of foreground window 130 is clipped against star 150. As discussed above, star 150 is a concave polygon. Clipping line segment 131 against star 150 here results in three line segments shown as line segment 131A, line segment 131B, and line segment 131C. Line segment 131 enters and exits polygon 150 twice resulting in two non-visible segments.

Another example of where clipping is used is for polygon fills. Referring again to FIG. 1B, star 150 demonstrates a polygon fill. A polygon fill is a pattern applied to the interior of a polygon. Cross-hatch pattern 180 is a polygon fill. Cross-hatch pattern 180 is comprised of two sets of parallel line segments 180A and 180B offset in angle from one another. Other examples of fills include parallel line fills such as star 150 filled solely with one set of parallel line segments such as parallel line segments 180A or 180B. For polygon fills, each line segment comprising the pattern must be clipped to the interior of the polygon. This is one type of application where conventional clipping algorithms are used. Other examples include virtual reality graphics where objects appear to move in three dimensions.

Two special cases can arise during clipping. One involves a line segment intersecting a vertex of a polygon. The other, known as a colinear intersection, involves a line segment intersecting a polygon along a side of the polygon in such a manner that the line segment is on top of the side of the polygon. A clipping algorithm must be able to handle these special cases.

Conventional clipping algorithms are well known in the prior art. However, conventional clipping algorithms perform all mathematical operations using fixed point, or integer, arithmetic. This poses several problems for computationally intensive applications, such as virtual reality graphics systems, which use floating point numbers extensively. Floating point numbers are required in these types of applications to accurately display graphic images.

Thus, in order to use conventional clipping algorithms, these types of applications must convert line segment end points and polygon vertices stored as floating point numbers into integers resulting in a loss of accuracy. Furthermore, small floating point numbers must be scaled up prior to conversion and clipping, and then scaled back down to avoid severe loss of accuracy. Conversely, large floating point numbers must be scaled down prior to conversion and clipping, and then scaled back up to avoid overflow. For polygons represented with both large and small floating point numbers, loss of accuracy is unavoidable using clipping algorithms that perform mathematical operations using integer arithmetic. This loss of accuracy results in intersections where there are none, and no intersections where there should be.

Thus, what is needed is a method for performing the entire clipping algorithm in the floating point domain.

SUMMARY OF THE INVENTION

The present invention is a method for clipping a line segment against an arbitrarily shaped polygon in the floating point domain. The present invention performs clipping by first rotating the line segment and the polygon to a more convenient alignment with respect to the x-axis and y-axis. The present invention then clips the line segment against the polygon following established clipping algorithms adapted to use floating point arithmetic. Finally, the present invention rotates the clipped line segment back to its original position with respect to the x-axis and y-axis, resulting in a line segment properly clipped against a polygon.

One feature of the present invention is that the line segments and polygon are stored and operated on using floating point numbers. Conventional methods require that line segments and polygons be stored using integers, or require line segments and polygons to be converted from floating point numbers to integers prior to performing clipping in the integer domain. Thus, the present invention reduces the amount of computation required to perform clipping while allowing the accuracy of a floating point representation.

BRIEF DESCRIPTION OF THE DRAWINGS

Further features and advantages of the present invention, as well as the structure and operation of various embodiments of the present invention, are described in detail below with reference to the accompanying drawings.

FIGS. 21A–21B are diagrams which show the possible orientations between which are discriminated by decision step 1304.

FIGS. 21C–21D are diagrams which show the possible orientations between which are discriminated by decision step 1306.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 18:
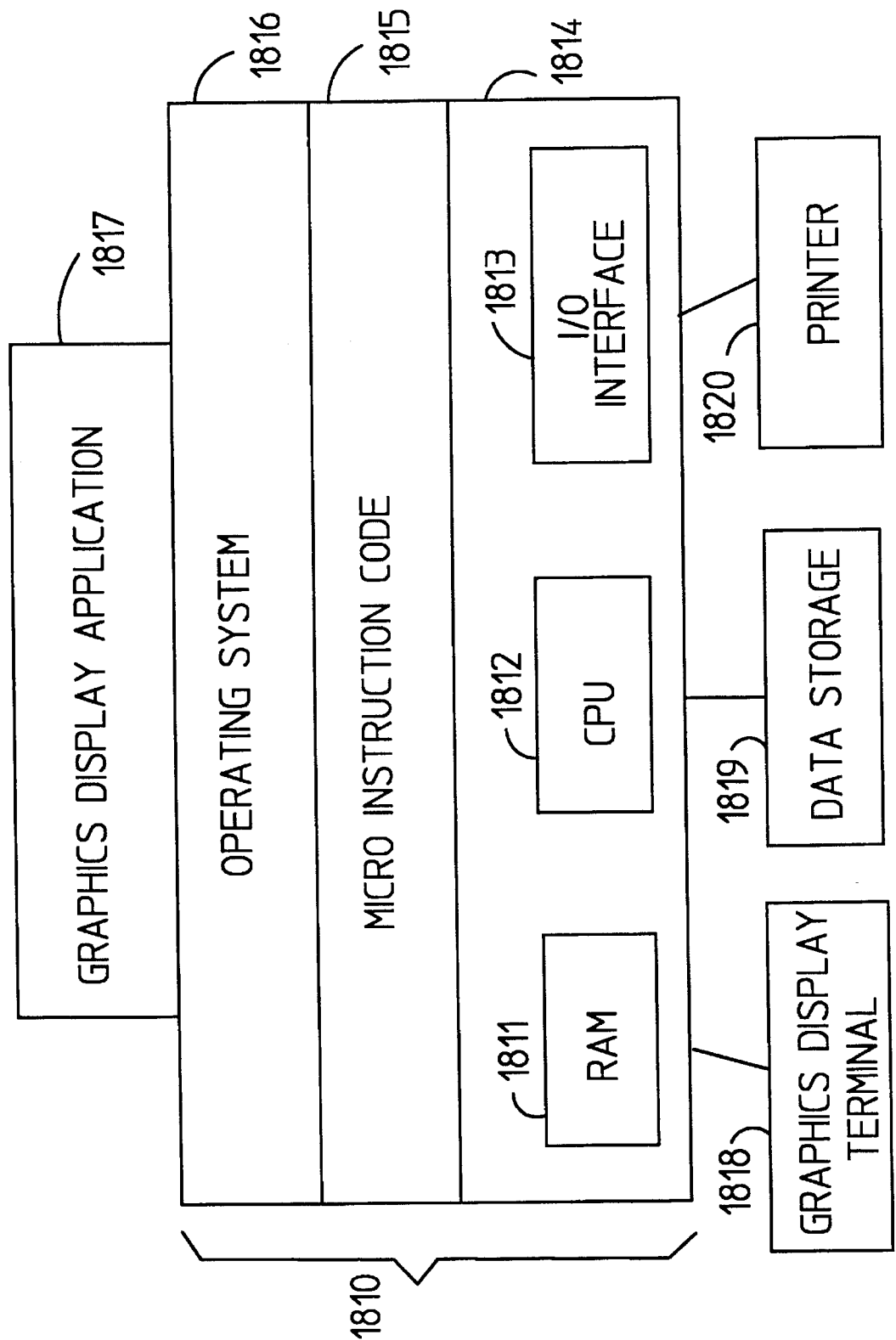
FIG. 18 is a computer environment running a graphics application utilizing the system and method of the present invention.

FIG. 18 illustrates an environment in which a preferred embodiment of the present invention operates. The preferred embodiment operates on a computer platform 1810. Computer platform 1810 includes certain hardware units 1814 including one or more central processing units (CPU) 1812, a random access memory (RAM) 1811, and an input/output (I/O) interface 1813. Computer platform 1810 includes an operating system 1816, and may include microinstruction code 1815. A computer graphics application 1817 may be part of microinstruction code 1815 or an application program to be executed via operating system 1816. Various peripheral components may be connected to computer platform 1810, such as a graphics display 1818, a data storage device 1819, and a printing device 1820.

Computer graphics application 1817 clips lines against polygons in order to construct proper graphics images. Computer graphics application 1817 performs this clipping in software. A person skilled in the art would recognize that the clipping could also be performed with microcode or hardware or some combination in order to improve performance. According to the present invention, clipping a line segment against a polygon is performed in the floating point domain. This is accomplished first by rotating the line segment and polygon about an arbitrary point so that the line segment is parallel with an axis of a coordinate frame. Specifically, the line segment and polygon are rotated so that the line segment is parallel to the y-axis of the coordinate frame. A person of ordinary skill in the art will recognize that the line segment and polygon could be rotated alternatively so that the line segment is parallel to the x-axis.

According to a preferred embodiment, the rotation is performed such that a first end point of the line segment is below a second end point of the line segment. In other words, the y-coordinate of the first end point is less than the y-coordinate of the second end point. A person skilled in the art would recognize that the rotation could be performed such that the second end point is below the first end point as an alternate embodiment.

Figure 2:
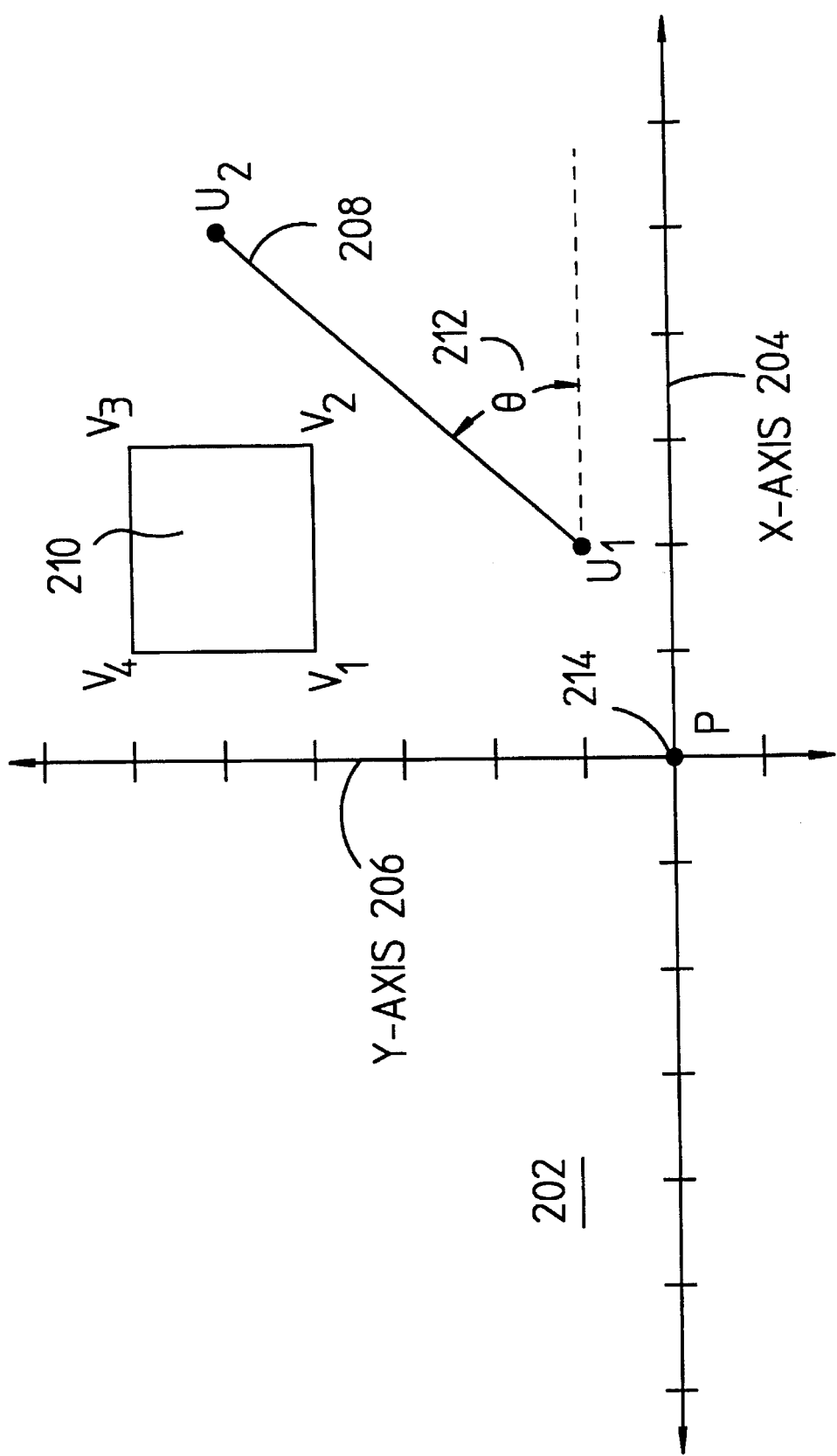
FIG. 2 is a representation of a line segment and a polygon shown with respect to a coordinate system.

FIG. 2 shows a coordinate frame 202 comprised of an x-axis 204 and a y-axis 206. A line segment 208 and a polygon 210 are shown in coordinate frame 202. Line segment 208 is comprised of two end points: $U_1$ and $U_2$. Polygon 210 is comprised of four vertices: $V_1$, $V_2$, $V_3$, and $V_4$. Each of the end points and vertices is represented in coordinate frame 202 with an x-coordinate and a y-coordinate. An angle of the line segment 208 with respect to x-axis 204 is represented by theta 212.

Figure 3:
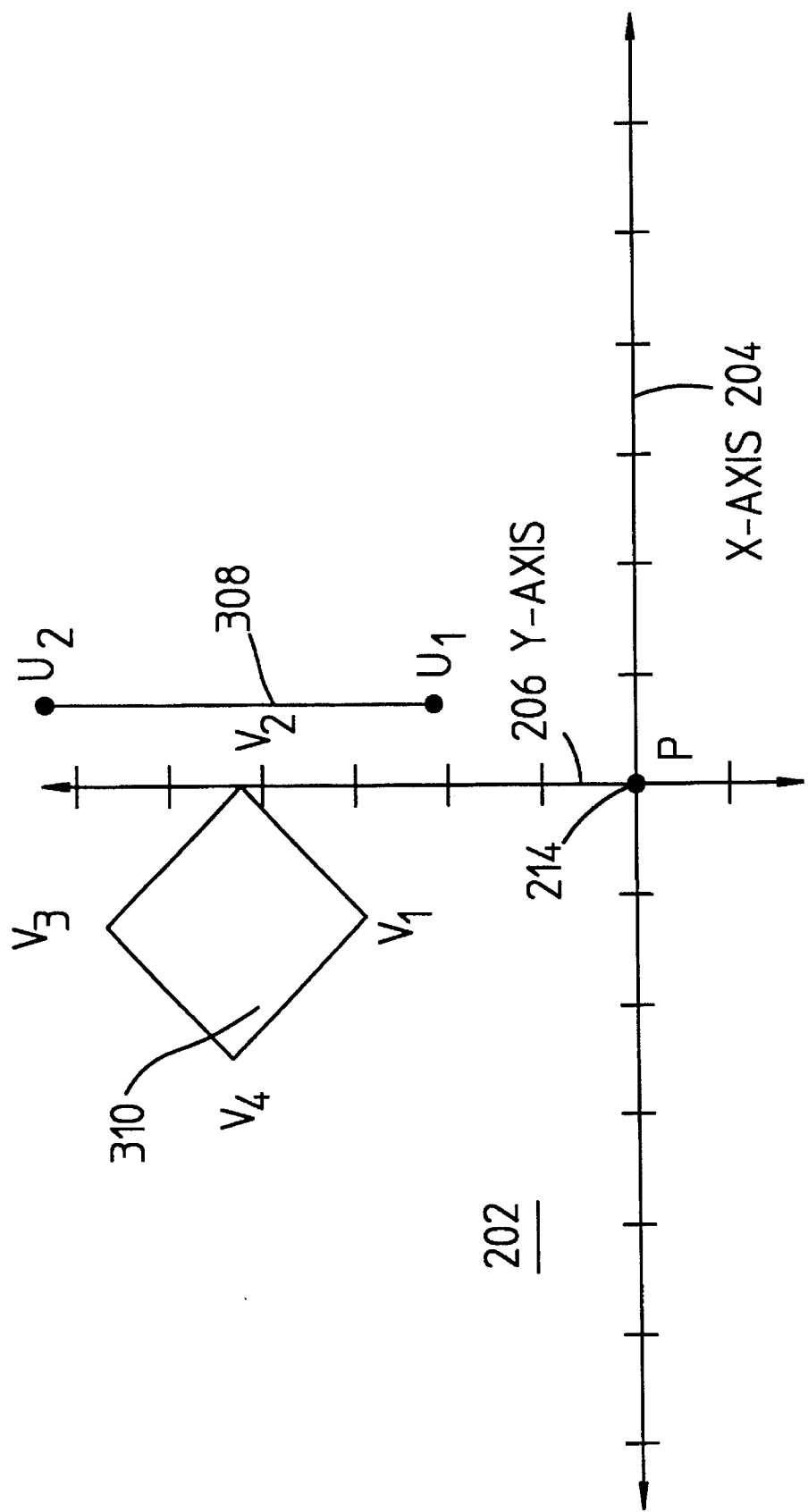
FIG. 3 is a representation of the line segment and the polygon shown in FIG. 2 rotated with respect to the coordinate system.

FIG. 3 represents a rotated line segment 308 and a rotated polygon 310 in coordinate frame 202. Rotated line segment 308 is a result of rotating line segment 208 about a point 214 by an angle equal to ninety degrees minus theta 212 (i.e., 90–angle 212 degrees). This is the angle required to rotate line segment 208 so that it is parallel to y-axis 206. Point 214 is an arbitrarily chosen point in coordinate frame 202. According to a preferred embodiment of the present invention, point 214 is chosen to be the origin of coordinate frame 202.

Figure 22:
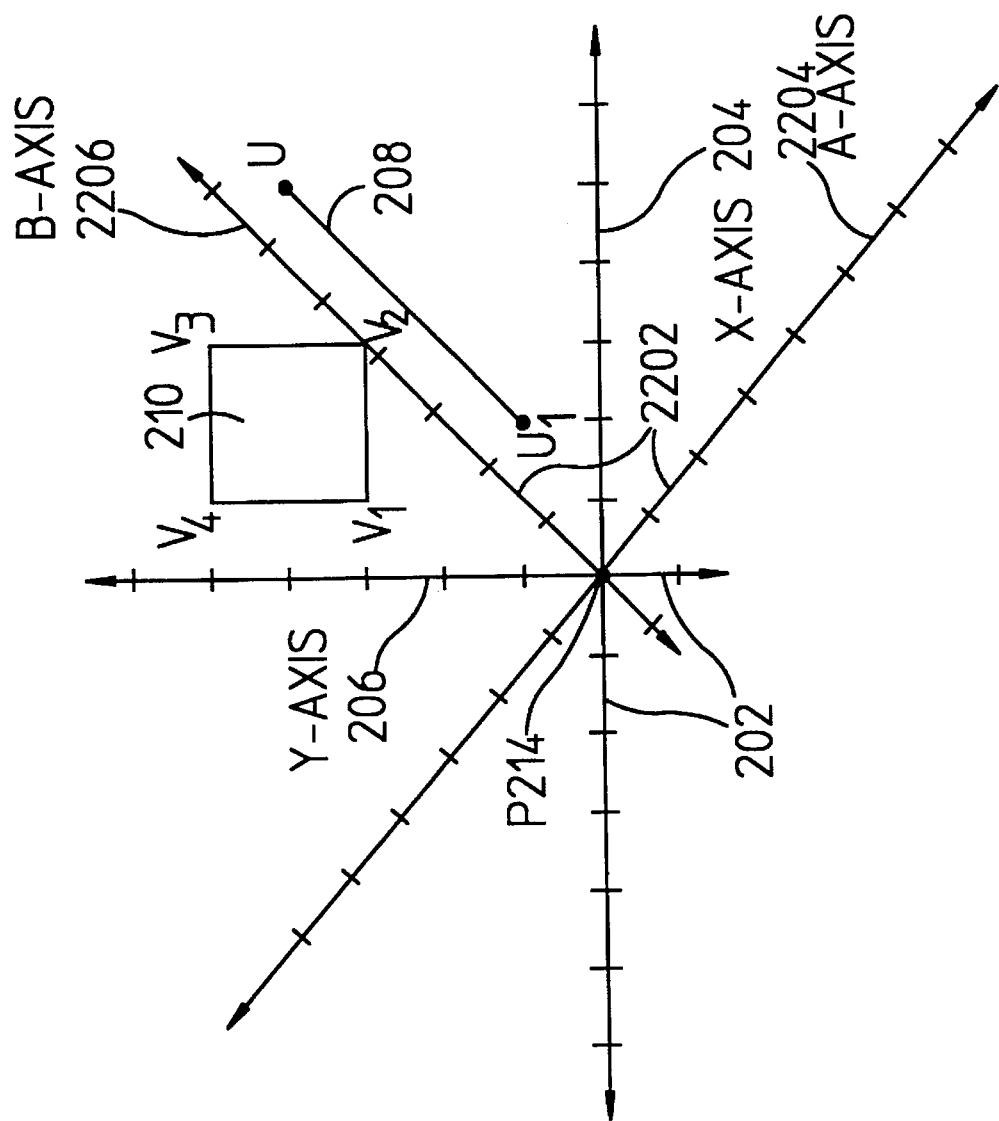
FIG. 22 is a representation of the line segment and the polygon shown in a first and second coordinate frames.

In an alternate embodiment, a coordinate transformation is performed transforming line segment 208 and polygon 210 from a first coordinate frame 202 into a second coordinate frame 2202 as shown in FIG. 22. Second coordinate frame 2202 is chosen in such a way that either of its axes (i.e., a-axis 2204 or b-axis 2206) is parallel with line segment 208. After the coordinate transformation, line segment 208 and polygon 210 will appear in second coordinate frame 2202 as rotated line segment 308 and rotated polygon 310 appeared in first coordinate frame 202 as shown in FIG. 3. A person skilled in the relevant art will recognize that the method of rotation discussed above and the coordinate transformation represent alternate operations which ultimately produce the same results.

A purpose of the rotation is to simplify and reduce the mathematical comparisons used to determine where, if at all, the line segment intersects the polygon. Having the line segment parallel to the y-axis results in both end points having the same x-coordinate. Thus, polygon vertices can be easily determined as being to the left of the line segment (i.e., the x-coordinate of the vertex is less than the x-coordinates of the end points of the line segment) or to the right of the line segment (i.e., the x-coordinate of the vertex is greater than the x-coordinate of the end points of the line segment).

Many potential intersections of the line segment with the polygon can be evaluated based on the left or right determination alone, or in other words, based on one dimension (i.e., the x-coordinate). For example, if two consecutive vertices both lie to the left of the line segment, then no intersection can possibly occur between these vertices. Likewise, if two consecutive vertices both lie to the right of the line segment, then no intersection can occur between these vertices either. However, if one vertex lies on or to the left and one lies on or to the right, then a potential intersection may occur between the vertices depending on values of the y-coordinates of the vertices. Other special cases such as intersections at vertices or colinear intersections can be identified using the left or right determination as well.

The left or right determination is performed by the present invention using inequality operations (i.e., less than, greater than, etc.). These inequality operations enable the present invention to function properly using floating point numbers. This is due to the finite precision of floating point numbers. Performing the rotation prior to clipping facilitates using inequality operations in the present invention without additional intermediate calculations. For example, an intersection can be computed between a line passing through two consecutive vertices and a line segment. Then, the intersection can be evaluated to determine whether it lies on or between the vertices or whether it lies outside the vertices.

Figure 4:
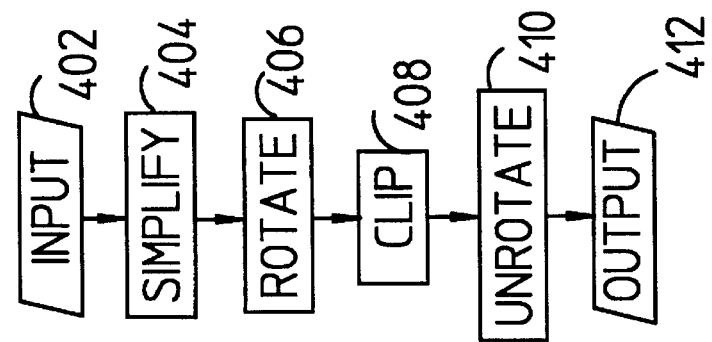
FIG. 4 is flow diagram illustrating the processing performed by the present invention.

FIG. 4 illustrates a high level flowchart of the operation of a preferred embodiment of the present invention. The following discussion will illustrate the method used by the preferred embodiment with respect to FIG. 4 to perform polygon clipping in the floating point domain. In a step 402, the present invention receives input from a calling procedure. The input includes a polygon represented as a series of sequential vertices defining the perimeter of the polygon represented as $V_1, V_2, V_3, \ldots V_n$, the number of vertices defining the polygon represented as n, and a line segment represented as end points $U_1$ and $U_2$. Vertices $V_1$ through $V_n$ and endpoints $U_1$ and $U_2$ represent cartesian coordinates stored as floating point numbers. For simplicity, the following convention is utilized throughout the remaining discussion: $V_1.x$ refers to the x-coordinate of vertex $V_1$, and $V_1.y$ refers to the y-coordinate of vertex $V_1$.

In a step 404, the present invention simplifies the polygon received as input in step 402. The simplification is done to ensure that the polygon is in proper form and will be described in detail with reference to FIG. 5. In a step 406, the present invention receives the simplified polygon and line segment, and rotates them so that the line segment is parallel to the y-axis. This will be described in detail with reference to FIG. 6. In a step 408, the present invention receives the rotated polygon and the rotated line segment and clips the rotated line segment to the rotated polygon. This will be described in detail with reference to FIG. 7–17. In a step 410, the present invention receives a clipped, rotated line segment and unrotates it back to its original orientation with respect to coordinate frame 202. In a step 412, the present invention outputs a clipped line segment represented as $S_1, S_2, S_3, \ldots, S_m$ and the number of points defining the clipped line segment represented as m. $S_1$ through $S_m$ represent the visible portions of the rotated line segment as pairs of end points in cartesian coordinates stored as floating point numbers. According to the present invention, $S_1$ and $S_2$ define the first visible portion of the clipped line segment, $S_3$ and $S_4$ define the second visible portion, etc. Thus, m will always be an even number because each portion of the clipped segment must be represented with two end points. Additionally, if m is 0, then the entire line segment has been clipped and is not visible.

Figure 5:
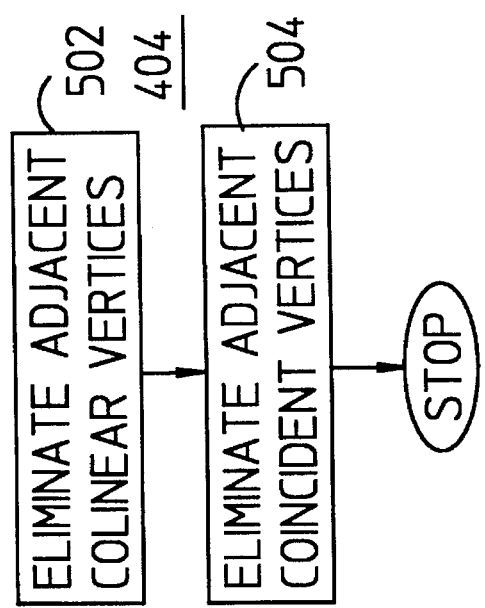
FIG. 5 is flow diagram illustrating the processing performed by step 404 in greater detail

FIG. 5 is a flowchart illustrating the processing performed during the simplification in step 404 above. In a step 502, adjacent colinear vertices are eliminated from $V_1$ through $V_n$. Adjacent colinear vertices occur when three or more sequential vertices lie on the same line. Because only two vertices are required to define a line segment, the vertices between a first colinear vertex and a last colinear vertex are eliminated. This ensures that clipping will proceed properly if the line segment $U_1U_2$ is colinear to a polygon edge.

In a step 504, adjacent coincident vertices are eliminated from $V_1$ through $V_n$. Adjacent coincident vertices occur when two or more sequential vertices define the same point. Thus, the vertices have the same x-coordinate and y-coordinates. Only one of the vertices is necessary. Eliminating the unnecessary vertices ensures clipping will proceed properly if the line segment $U_1U_2$ intersects the polygon at coincident vertices.

Figure 6:
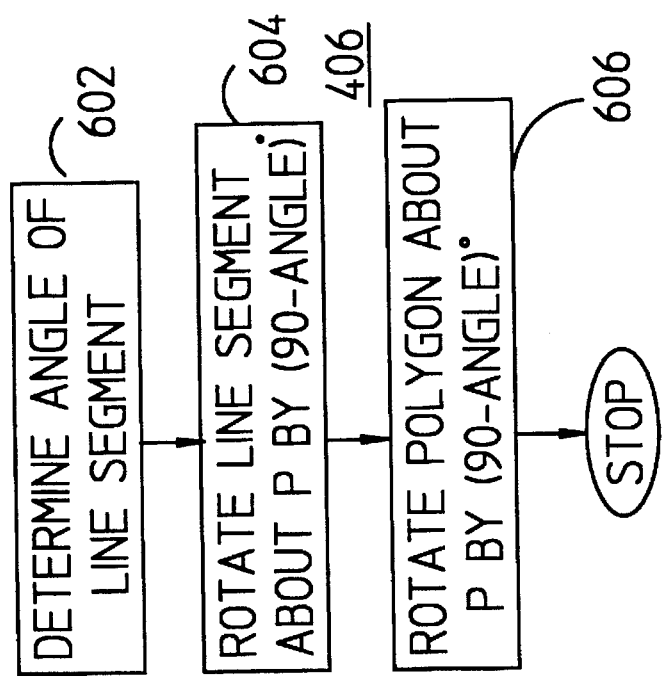
FIG. 6 is flow diagram illustrating the processing performed by step 406 in greater detail.

FIG. 6 is a flowchart illustrating processing performed by the rotation in step 406 above. In a step 602, an angle 212 that line segment 208 forms with respect to x-axis 204 is determined. This is performed using well known trigonometric functions. A person skilled in the art would recognize that the angle could be obtained with respect to the y-axis as well. In a step 604, line segment 208 is rotated about an arbitrary point P 214 by (90–angle 212) degrees. This is the angle of rotation required to align line segment 208 parallel with y-axis 206. According to the a preferred embodiment, P 214 is the origin of coordinate frame 202. The rotation of line segment 208 is accomplished by rotating each end point by (90–angle 212) degrees using well known trigonometric functions. In a step 606, polygon 210 is rotated about P 214 by (90–angle 212) degrees. Similarly, the rotation of polygon 210 is accomplished by rotating each vertex by (90–angle 212) degrees about P 214 using well known trigonometric functions.

Figure 7:
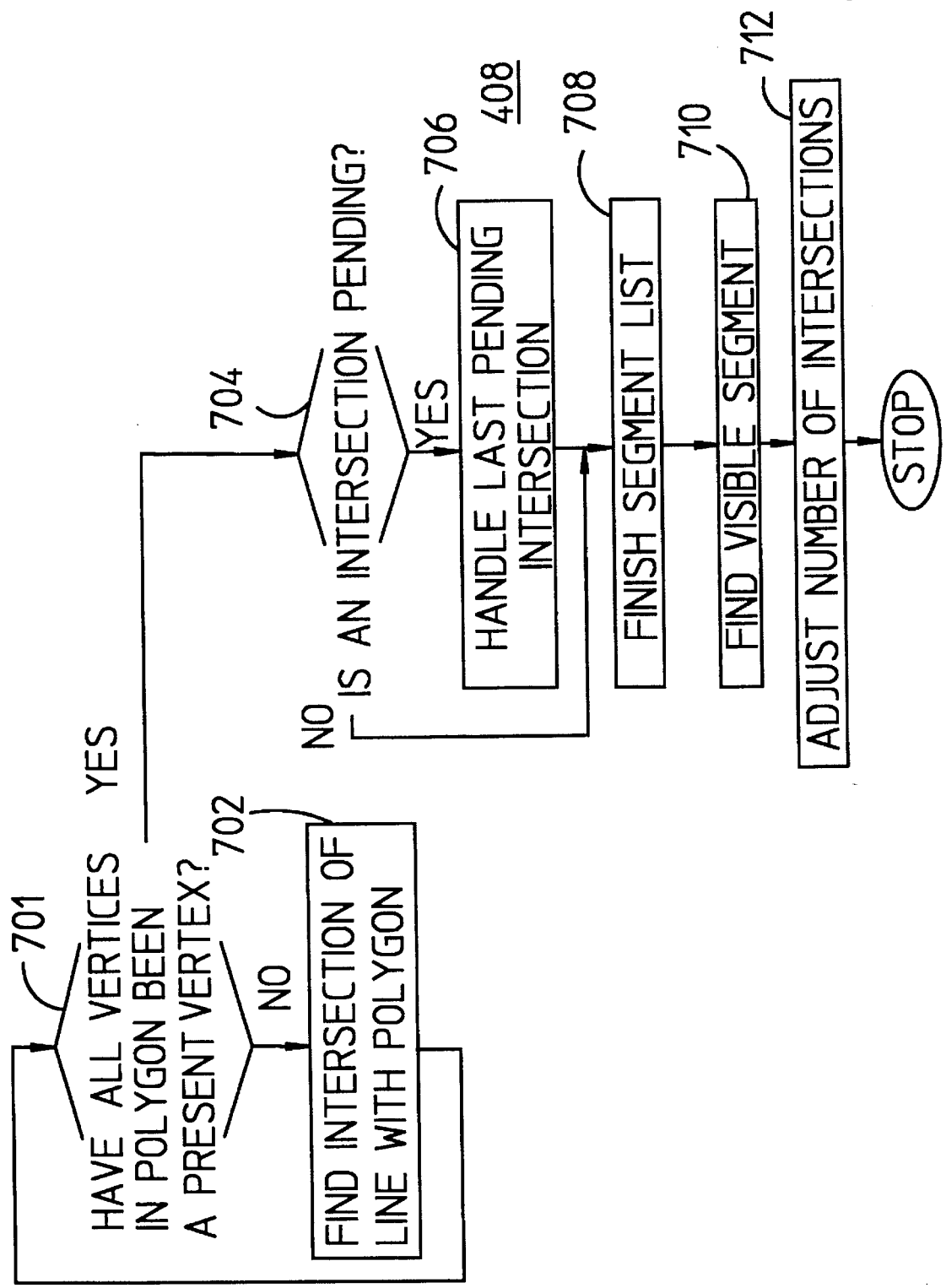
FIG. 7 is flow diagram illustrating the processing performed by step 408 in greater detail.

FIG. 7 is a flowchart illustrating the processing performed by the clipping in step 408 above. In a step 701, the present invention determines whether all vertices in polygon 310 have been considered as a present vertex by clipping step 408. If so, processing continues at a decision step 704; otherwise, the next vertex becomes the present vertex and processing continues at a step 702.

In a step 702, the present invention finds the intersections of rotated line segment 308 (hereinafter line segment 308) with rotated polygon 310 (hereinafter polygon 310). The purpose of this processing is to determine where, if at all, line segment 308 intersects polygon 310. This step will be defined in further detail below in reference to FIG. 8. After completing step 702, the present invention proceeds back to step 701.

In decision step 704, the present invention determines if an intersection is pending from the processing of step 702. Determining whether an intersection is pending is used to avoid processing each polygon vertex more than once. If, during the processing of the present vertex, it is determined that an intersection occurs at a next vertex in step 702, a preferred embodiment of the present invention delays the processing of the intersection at the next vertex until the next iteration of step 702. At this point, the next vertex is said to be a pending intersection. At the next iteration of step 702, the present vertex (which was the next vertex in the previous iteration) is now pending. The fact that the present vertex is a pending intersection forces step 702 to accept the vertex as an intersection. This avoids double counting intersections at polygon vertices. If such a vertex is pending is also the last vertex, the present invention handles the last pending intersection in a step 706 described in detail with reference to FIG. 17 and proceeds to a step 708. Otherwise, if such an vertex is not pending, the present invention proceeds directly to step 708.

In step 708, the present invention finishes the segment list. The segment list includes the intersections of line segment 308 with polygon 310. Finishing the segment list involves including the end points of line segment 308 in the segment list. Additionally, the segment list is checked to determine if line segment 308 was clipped. This will be described in detail with reference to FIG. 10.

In a step 710, the present invention finds the visible segments of line segment 308 based on the segment list. Based on whether the segment joining the first two intersections in the segment list is visible, the present invention determines the pairings of intersections such that upon being output, $S_1$ and $S_2$ are a visible segment, $S_3$ and $S_4$ are a visible segment, etc. This processing is described in detail below with respect to FIG. 11.

In a step 712, a number of intersections is adjusted to account for the fact that an even number of end points are required to define the visible segments of line segment 308. Essentially, if the number of intersections is odd, one is subtracted from the number of intersections to make it an even number. In this case, the discarded point $S_m$ is, by definition, not visible.

Figure 8:
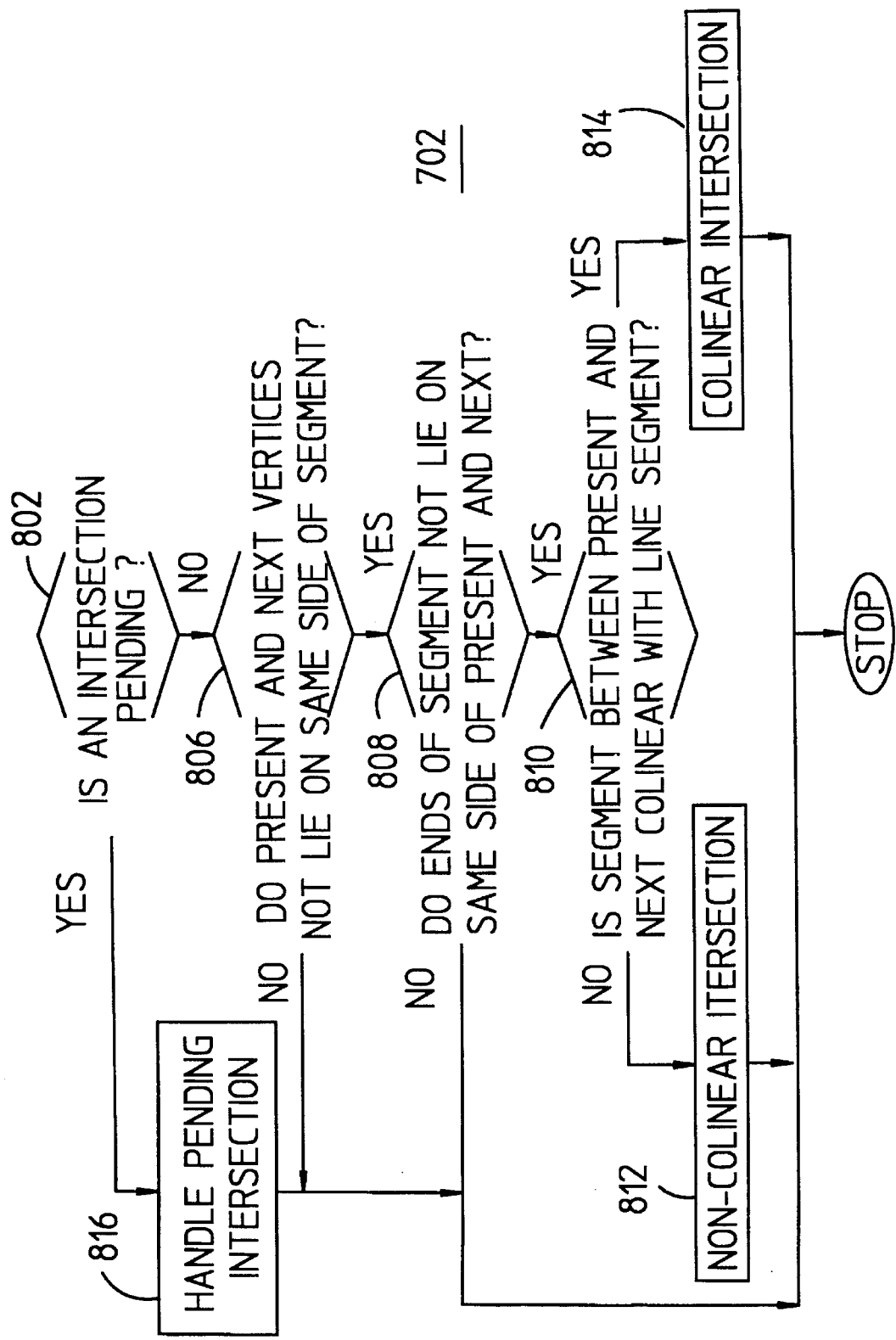
FIG. 8 is flow diagram illustrating the processing performed by step 702 in greater detail.

FIG. 8 is a flowchart illustrating the processing performed by step 702 above where the intersections of line segment 308 with polygon 310 are found. The processing performed by step 702 begins at a decision step 802. In decision step 802, the present invention determines if there is an intersection pending (in other words, the next vertex in the previous iteration of step 702 was an intersection). If there is an intersection pending, the present invention handles the pending intersection in a step 816. If there is not an intersection pending, the present invention proceeds to a decision step 806.

Figure 19B:
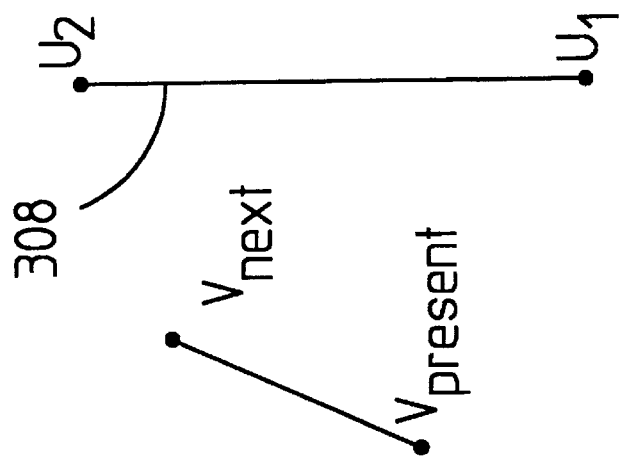
FIGS. 19A–19C are diagrams which show the possible orientations among which are discriminated by decision step 806.
Figure 19A:
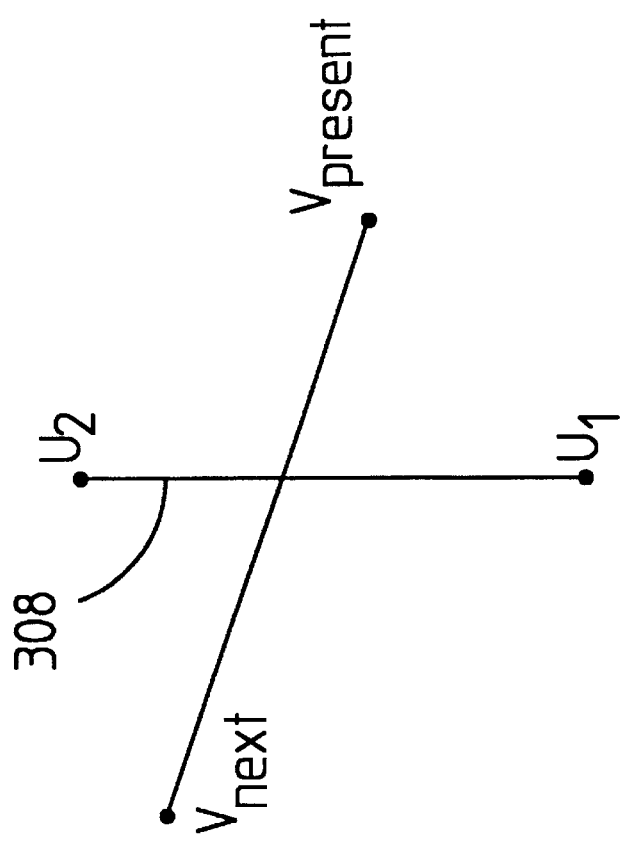
Figure 19C:
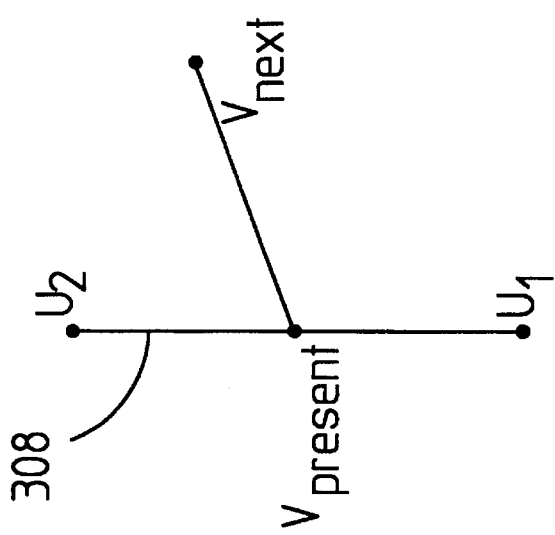

FIGS. 19A–19C show three exemplary orientations of the present and next vertices with line segment 308 which are applicable at this point in the processing. FIG. 19A contains a first orientation where the present vertex and the next vertex lie on opposite sides of line segment 308. FIG. 19B contains a second orientation where the present vertex and the next vertex lie on the same side of line segment 308. FIG. 19C contains a third orientation where the present vertex lies on line segment 308. This orientation also includes the orientation where the next vertex lies on line segment 308. In the preferred embodiment, this third orientation is treated as though the present vertex and the next vertex lie on opposite sides of line segment 308.

In decision step 806, the present invention determines if a present vertex and a next vertex do not lie on the same side of line segment 308. This is accomplished by comparing the x-coordinate of each the present and next vertices with the x-coordinate of one of the end points of line segment 308. If the x-coordinates of the present and next vertices do not lie on the same side of line segment 308, the present invention proceeds to a decision step 808. Otherwise, there is no intersection of line segment 308 between the present and next vertices and processing of step 702 is completed.

In decision step 808, the present invention determines if the end points of line segment 308 do not lie on the same side of a polygon line segment connecting the present and next vertices. This processing is similar to step 806 except that the present invention determines if the polygon line segment lies above or below line segment 308. If polygon line segment does lie above or below both end points, then there is no intersection of line segment 308 between the present and next vertices. Accordingly, processing of step 702 is completed. If polygon line segment does not lie above or below both end points, the present invention proceeds to a decision step 810.

In decision step 810, the present invention determines if a line segment between the present and next vertices is colinear with line segment 308. This is accomplished by determining whether the present and next vertices have the same x-coordinate. If the present and next vertices have the same x-coordinate at this point in the processing, then the two line segments are colinear. The present invention processes the intersection as a colinear intersection in a step 814. Otherwise, the present invention treats the potential intersection as a non-colinear intersection in a step 812.

In step 814, the present invention determines the extent of the colinear intersection. In other words, the present invention determines what portion of line segment 308 overlaps the line segment between the present and next vertices of the polygon. This processing is described in detail below with respect to FIG. 13. Upon completing step 814, processing of step 702 is completed.

In step 812, the present invention must still determine if there is an intersection of line segment 308 between the present and next vertices, and furthermore, where that intersection is located. This processing is described in detail below with respect to FIG. 12. Upon completing step 812, processing of step 702 is completed.

Figure 9:
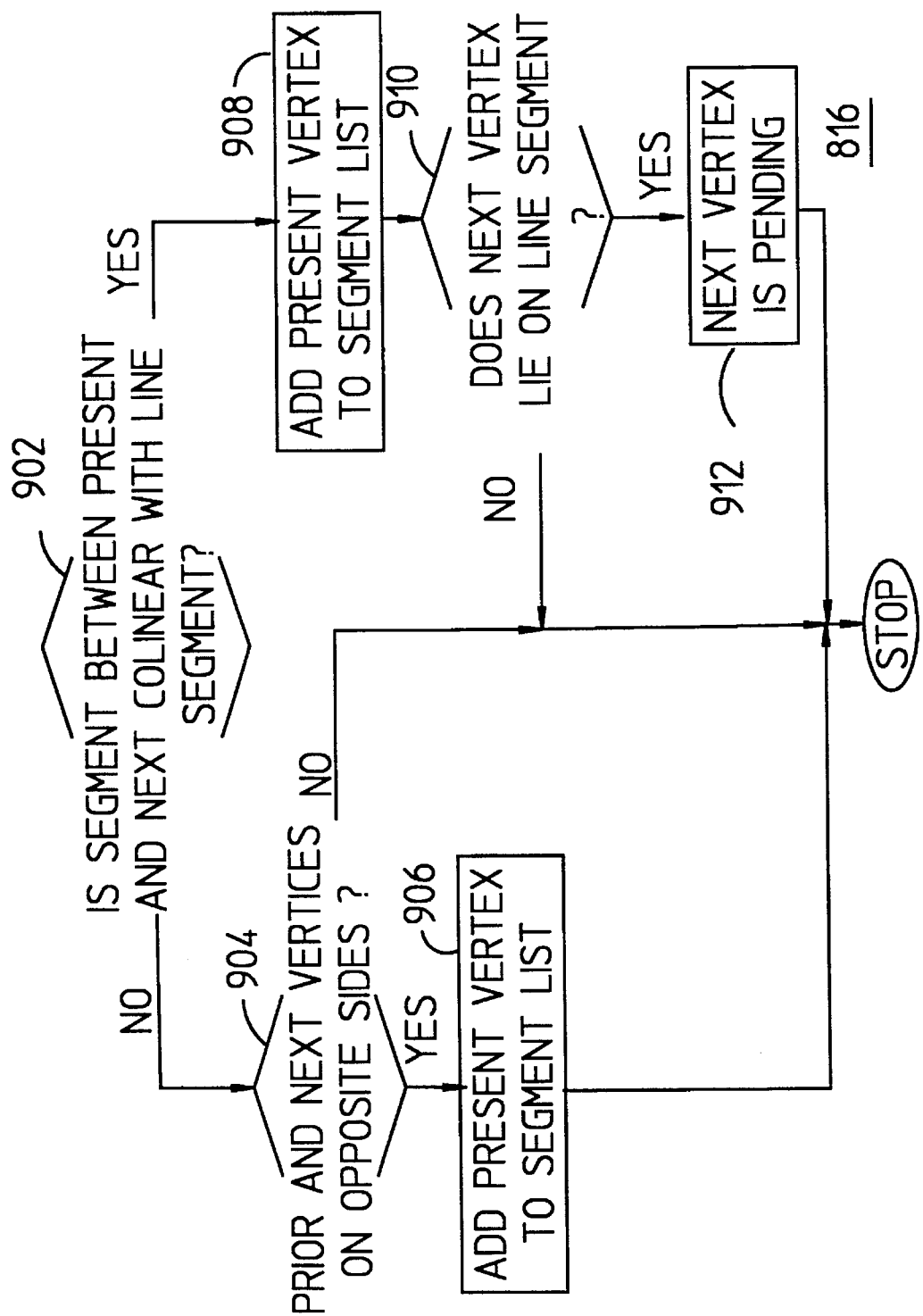
FIG. 9 is flow diagram illustrating the processing performed by step 816 in greater detail

FIG. 9 is a flowchart illustrating the processing performed by step 816 above where the last pending intersection is handled. In a decision step 902, the present invention determines if a line segment between the present and next vertices and line segment 308 are colinear. If they are colinear, the present vertex is added to the segment list in a step 908. Next, in a decision step 910, the present invention determines if the next vertex also lies on line segment 308. If the next vertex lies on line segment 308, then in a step 912, the next vertex is indicated as a pending vertex. Upon completing step 912, processing of step 816 is completed.

Figure 20B:
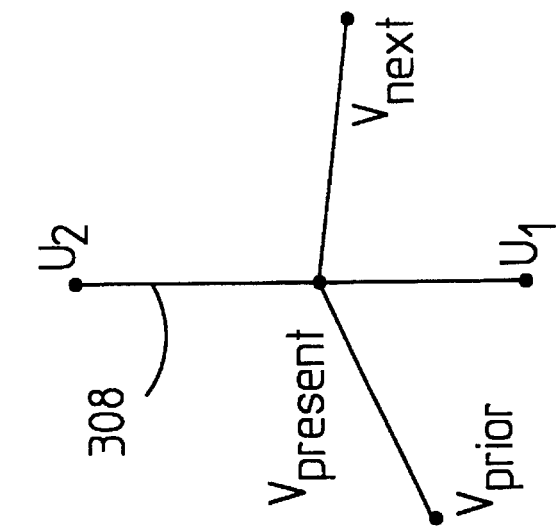
FIGS. 20A–20B are diagrams which show the possible orientations among which are discriminated by decision step 904.
Figure 20A:
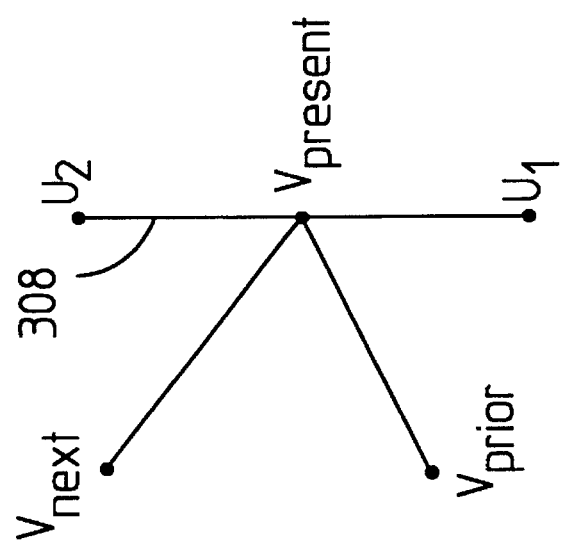

If the line segment between present and next vertices and line segment 308 are not colinear, then, in decision step 904, the present invention determines if the prior and next vertices lie on opposite sides of line segment 308. FIG. 20A and 20B illustrates two orientations of the prior, present, and next vertices with respect to line segment. 308 applicable at this point in the processing. FIG. 20A shows the prior and next vertices on the same side of line segment 308. FIG. 20B shows the prior and next vertices on opposite sides of line segment 308. If the prior and next vertices lie on opposite sides (as shown in FIG. 20B), then the present vertex is added to the segment list in a step 906. Upon completion of step 906, processing of step 816 is completed. Otherwise, if the prior and next vertex do not lie on opposite sides (as shown in FIG. 20A), then, even though the present vertex lies on line segment 308, it is not needed to properly display polygon 310 and clipped line segment 308. Thus, there is no pending intersection and processing of step 816 is completed.

Figure 10:
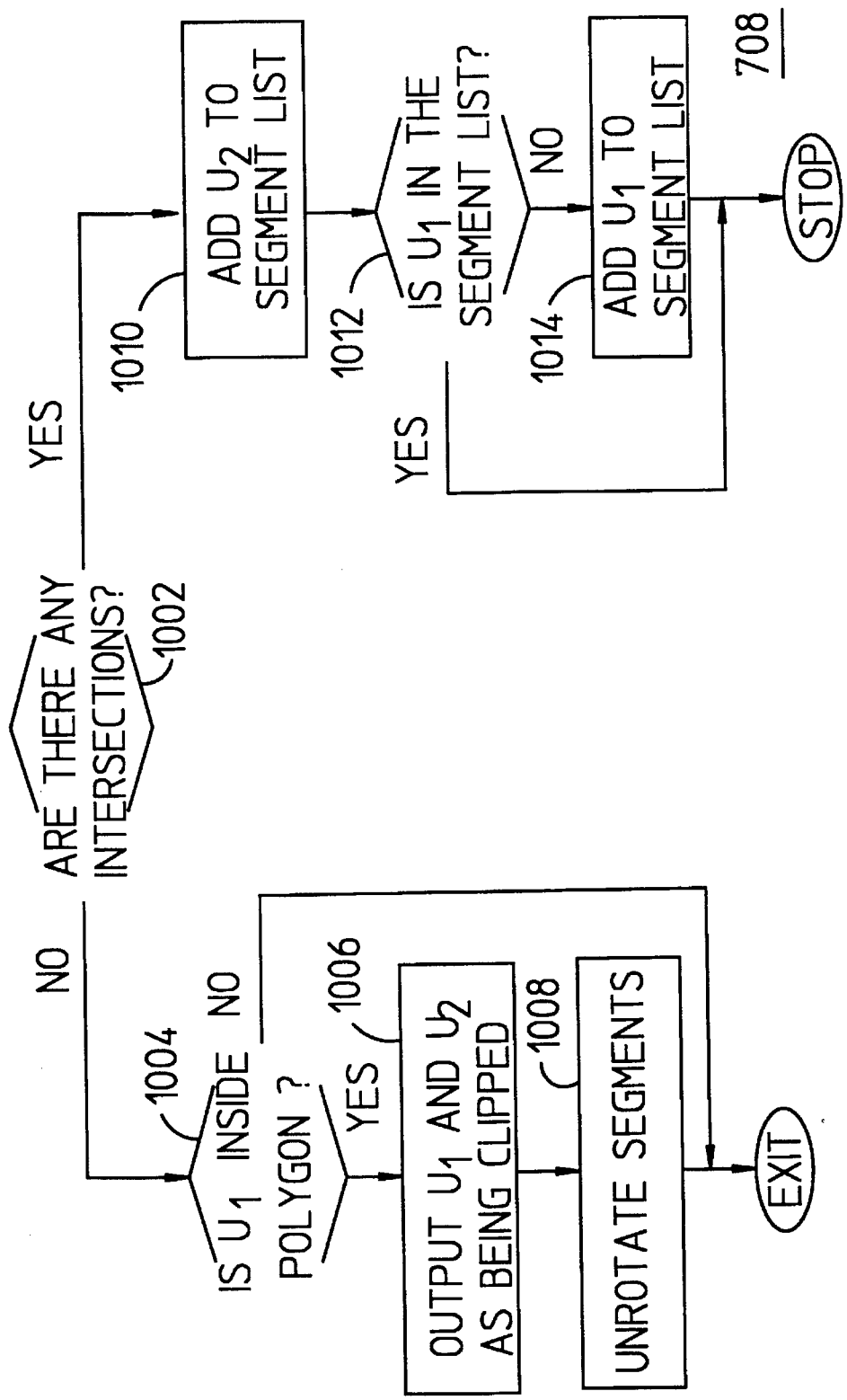
FIG. 10 is flow diagram illustrating the processing performed by step 708 in greater detail.

FIG. 10 is a flowchart illustrating the processing performed by step 708 above referred to as finishing the segment list. The purpose of this processing is make sure that the end points of line segment 308 are included in the list. This processing also evaluates whether line segment 308 is entirely inside or outside polygon 310. In a decision step 1002, the present invention determines if the segment list contains any intersections. If there are no intersections, processing continues at a decision step 1004; otherwise, processing continues at a step 1010.

In decision step 1004, the present invention determines whether $U_1$ (the first end point of line segment 308) is inside polygon 310. If $U_1$ is inside polygon 310, then $U_2$ is also inside polygon 310 because there are no intersections as determined in decision step 1002. Thus, the clipped line segment is comprised of $U_1$ and $U_2$. These points store as the rotated clipped line segment in a step 1006. Processing continues at a step 1008 where the present invention unrotates the rotated clipped line segment in a similar fashion to the original rotation performed in step 406. In this case, however, only the clipped line segments are rotated about P. Additionally, the angle of rotation is the negative of the original angle (i.e., −90+angle 212 degrees). Using the negative angle as the angle of rotation results in the clipped line segment in its original orientation with respect to coordinate frame 202. After the rotated clipped line segment have been unrotated, the present invention outputs the clipped line segment and processing is completed. In decision step 1004, if $U_1$ is not inside polygon, then neither is $U_2$. In this case no clipped line exists to output.

In step 1010, the present invention adds $U_2$ to the end of the segment list to complete the segment list. In a decision step 1012, the present invention determines whether $U_1$ is in the segment list. If $U_1$ is not in the segment list, it is added to the beginning of the segment list in a step 1014. Once $U_1$ is in the segment list, the processing of step 708 is completed resulting in a finished segment list.

Figure 11:
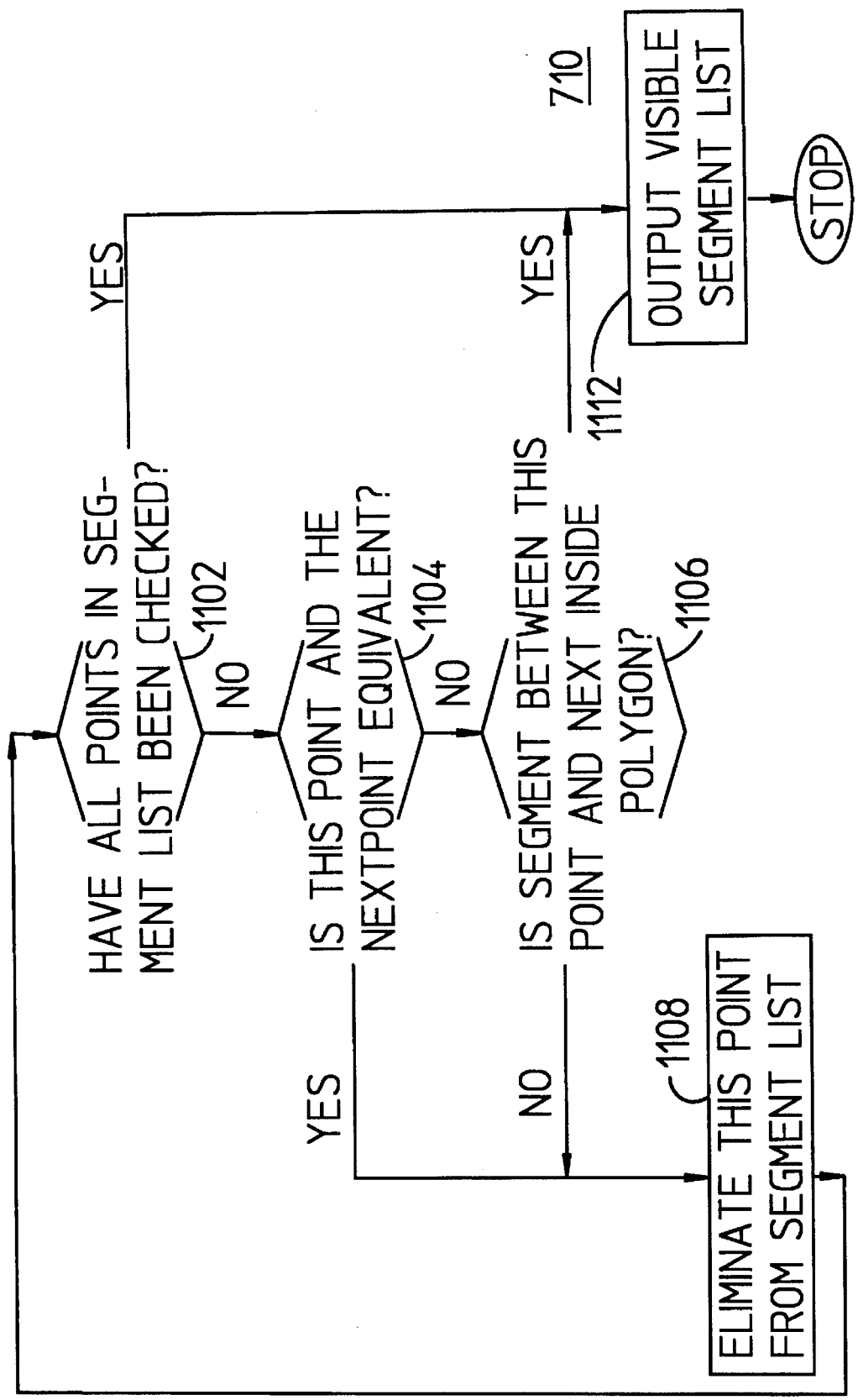
FIG. 11 is flow diagram illustrating the processing performed by step 710 in greater detail.

FIG. 11 is a flowchart illustrating the processing performed by step 710 above where the visible portion of the segment list is found. In a decision step 1102, the present invention determines whether all points in the segment list have been checked by this processing. If all the points have not been checked, processing continues at a decision step 1104; otherwise, processing continues at a step 1112.

In decision step 1104, the present invention determines whether the present point in the segment list under consideration is equivalent to the next point in the segment list. If the points are equivalent, the present point is eliminated from the segment list in a step 1108. This removes any redundant points from being included in the segment list. Upon completing step 1108, processing returns to decision step 1102. Otherwise, if the points are not equivalent, processing continues at a decision step 1106.

In decision step 1106, the present invention determines whether a line segment between the present point and the next point lies entirely inside polygon 310. If this line segment does not lie inside polygon 310, the present point is eliminated from the segment list in step 1108 and processing returns to decision step 1102. Otherwise, if this line segment is inside the polygon, processing continues at a step 1112.

The processing prior to step 1112 is performed to remove any invisible (i.e., clipped) segments from the segment list, and to find the first visible segment as a result of clipping line segment 308 against polygon 310. In step 1112, the present invention outputs the visible portion of segment list as the rotated clipped line segment. At this point, the processing of step 710 is completed.

Figure 12:
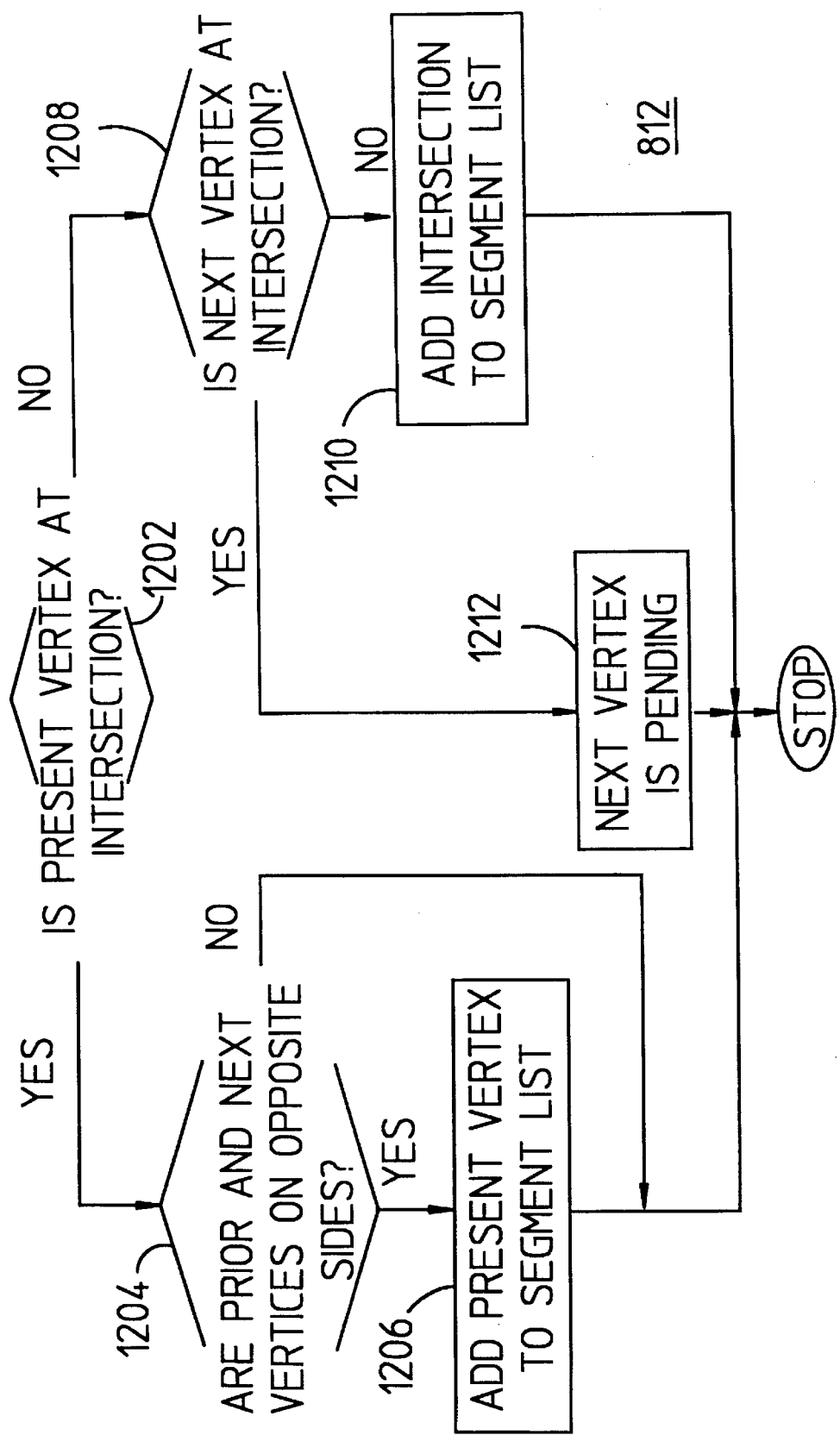
FIG. 12 is flow diagram illustrating the processing performed by step 812 in greater detail.

FIG. 12 is a flowchart illustrating the processing performed by step 812 above where non-colinear intersections are determined. In a decision step 1202, the present invention determines if the present vertex is at the point of intersection. If the present vertex is at the intersection, processing continues at a decision step 1204; otherwise, processing continues at a decision step 1208.

In decision step 1204, the present invention determines whether the prior vertex and the next vertex lie on opposite sides of line segment 308 (as shown in FIGS. 19A and 19B). If the prior and next vertices do lie on opposite sides, the present invention adds the present vertex to the segment list in a step 1206. Otherwise, the processing of step 812 is complete.

In decision step 1208, the present invention determines if the next vertex is located at the intersection. If the next vertex is not located at the intersection, the present invention adds the intersection to the segment list in a step 1210. If the next vertex is located at the intersection, the present vertex indicates that the next vertex is a pending intersection in a step 1212. This avoids saving the next vertex twice (i.e., once here and once on the next iteration of step 702).

Figure 13:
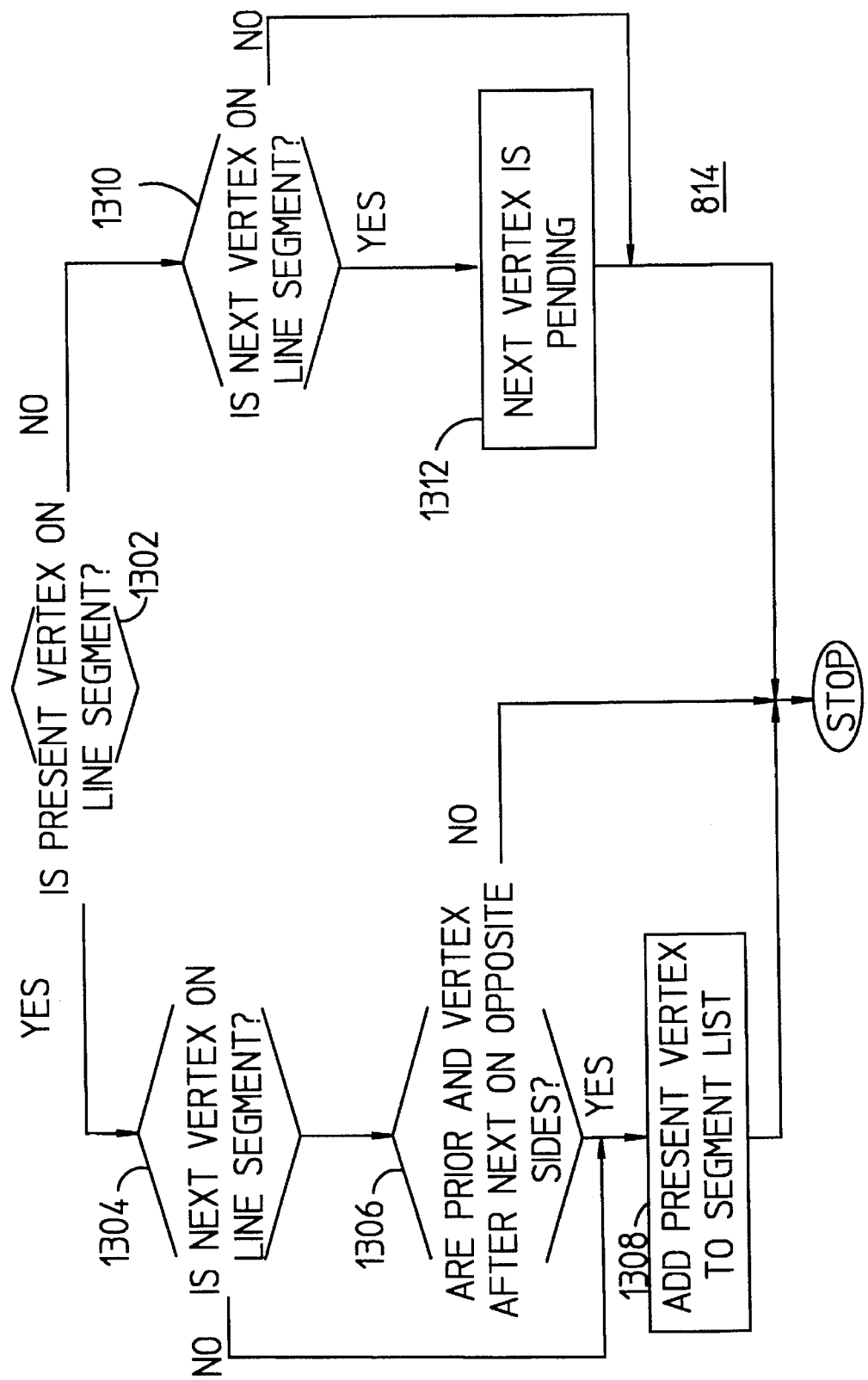
FIG. 13 is flow diagram illustrating the processing performed by step 814 in greater detail.

FIG. 13 is a flowchart illustrating the processing performed by step 814 above where a colinear intersection is processed. In a decision step 1302, the present invention determines if the present vertex lies on line segment 308. If the present vertex lies on line segment 308, processing continues at a decision step 1304; otherwise, processing continues at decision step 1310.

In decision step 1304, the present invention determines whether the next vertex also lies on line segment 308. FIGS. 21A and 21B illustrate the two exemplary orientations of the present and next vertices applicable at this point in the processing. FIG. 21A shows the orientation where the present and next vertices both lie on line segment 308. FIG. 21B shows the orientation where the present vertex lies on line segment 308, but the next vertex does not. If the next vertex lies on line segment 308, as shown in FIG. 21A, processing continues at decision step 1306. If the next vertex does not lie on line segment 308, as shown in FIG. 21B, the present invention adds the present vertex to the segment list in a step 1308.

Figure 21F:
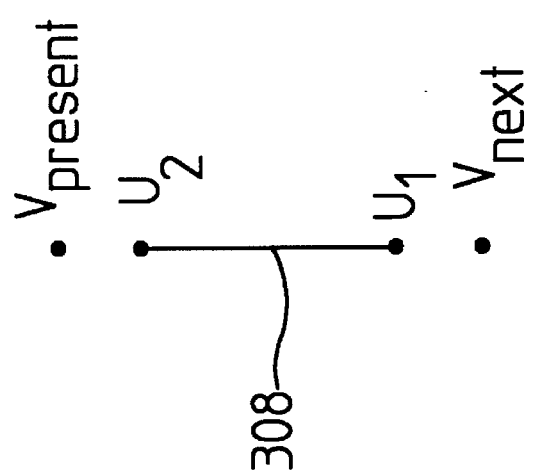
FIGS. 21E–21F are diagrams which show the possible orientations between which are discriminated by decision step 1310.
Figure 21E:
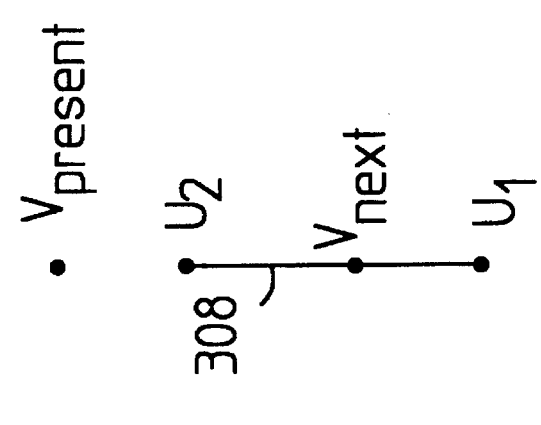
Figure 21D:
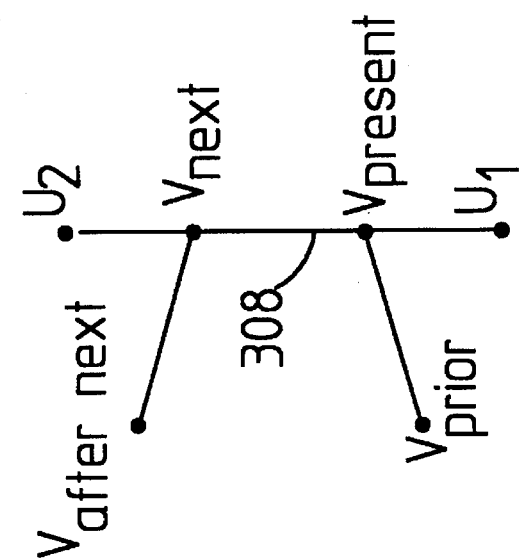

In decision step 1306, the present invention determines whether the prior vertex and the vertex after the next vertex lie on opposite sides of line segment 308. FIGS. 21C and 21D illustrate two exemplary orientations of the prior, present, next, and vertex after next vertices applicable at this point in the processing. FIG. 21C shows the orientation where the prior vertex and the vertex after next lie on opposite sides of line segment 308. FIG. 21D show the orientation where the prior vertex and the vertex after next lie on the same side of line segment 308. If the prior vertex and the vertex after next lie on opposite sides of line segment 308, as shown in FIG. 21C, the present invention adds the present vertex to the segment list in a step 1308. Otherwise, if the prior vertex and the vertex after the next vertex lie on the same side of line segment 308, the present vertex is not needed in the segment list to properly display line segment 308 and polygon 310, and the processing of step 814 is completed.

In decision step 1310, the present invention determines if the next vertex lies on line segment 308. FIGS. 21E and 21F illustrate the two exemplary orientations of the present and next vertices applicable at this point in the processing. FIG. 21E shows the orientation where the next vertex lies on line segment 308, but the present vertex does not. FIG. 21F shows the orientation where neither the present vertex nor the next vertex lie on line segment 308. If the next vertex does lie on line segment 308, as shown in FIG. 21E, the present invention indicates that the next vertex is pending in a step 1312. Otherwise, if the next vertex does not lie on line segment 308, as shown in FIG. 21F, the processing of step 814 is completed.

Figure 14:
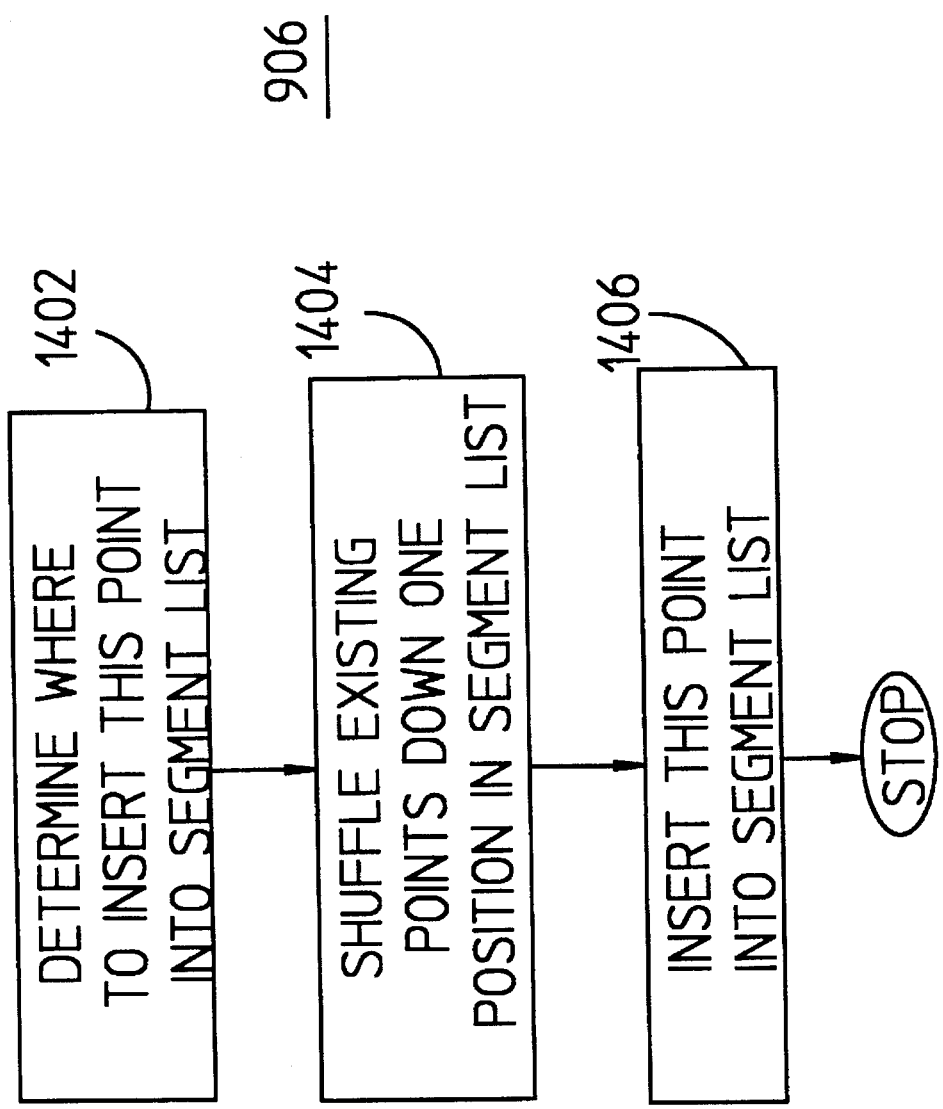
FIG. 14 is flow diagram illustrating the processing performed by step 906 in greater detail.

FIG. 14 is a flowchart illustrating the processing performed when a intersection is added to the segment list. The present invention maintains the segment list so that each intersection is in proper sequence along line segment 308. Because line segment 308 was rotated, the present invention maintains the segment list by placing intersections in ascending order based on their y-coordinates. In a step 1402, the present invention determines where to insert the intersection in the segment list based on the value of its y-coordinate. In a step 1404, the present invention shuffles down the intersections in the segment list having an y-coordinate greater that the y-coordinate of the intersection to be added by one position to make room for the added intersection. In a step 1406, the present invention inserts the intersection into the segment list at the determined insertion location.

Figure 15:
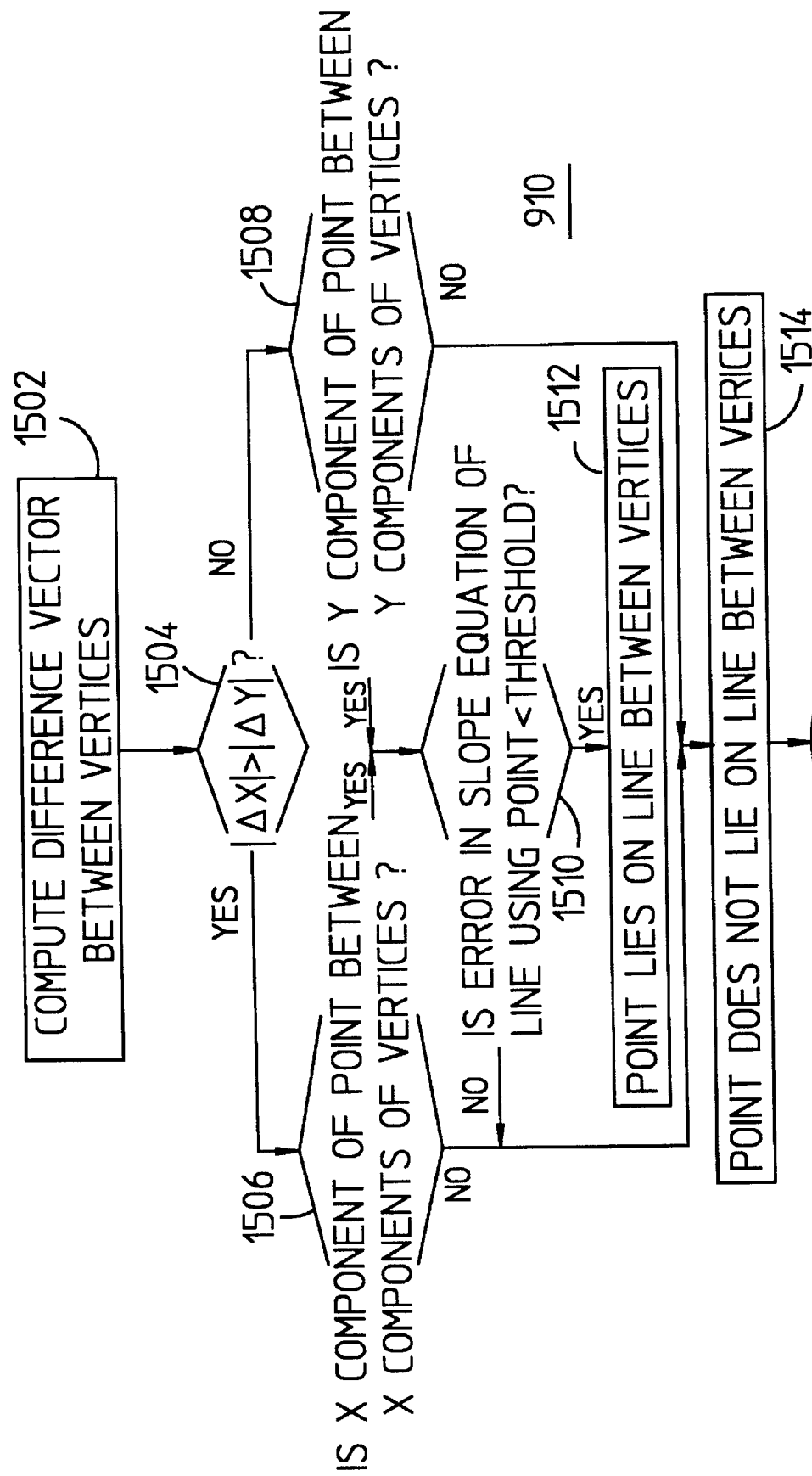
FIG. 15 is flow diagram illustrating the processing performed by step 910 in greater detail.

FIG. 15 is a flowchart illustrating the processing performed when a point is evaluated to determine whether it lies on a line segment joining two vertices. This processing is used when it is necessary to decide if vertices are colinear.

In a step 1502, the present invention calculates a difference vector between the two vertices. Next, in a decision step 1504, the present invention compares a magnitude of the x-coordinate of the difference vector against a magnitude of the y-coordinate of the difference vector. If the magnitude of the x-coordinate is greater than the magnitude of the y-coordinate, processing continues at a decision step 1506; otherwise, processing continues at as decision step 1508.

In decision step 1506, the present invention compares the x-coordinate of the point to the x-coordinates of the two vertices. If the x-coordinate of the point is between the x-coordinates of the two vertices, processing continues at a decision step 1510; otherwise processing continues at a step 1514.

In decision step 1508, the present invention compares the y-coordinate of the point to the y-coordinates of the two vertices. If the y-coordinate of the point is between the y-coordinates of the two vertices, processing continues at a decision step 1510; otherwise processing continues at a step 1514.

In decision step 1510, the present invention compares a slope of a line segment between the second vertex and the point (referred to as P) with a slope of a line segment between the first vertex and the second vertex. This comparison is based on the following expression:

$$[(P.y-V_2.y)/(P.x-V_2.x)]?=[(V_2.y-V_1.y)/(V_2.x-V_1.x)].$$

According to the present invention, this equation is manipulated to eliminate the division resulting in:

$$[(P.y-V_2.y)*(V_2.x-V_1.x)]?=[(V_2.y-V_1.y)*(P.x-V_2.x)].$$

Strictly speaking, checking for an exact equality in the floating point domain yields unsatisfactory results. Therefore, rather than directly comparing the terms, the present invention computes a magnitude of their difference and compares it against a threshold as:

$$|[(P.y-V_2.y)*(V_2.x-V_1.x)]-[(V_2.y-V_1.y)*(P.x-V_2.x)]|<\epsilon$$

In the preferred embodiment, the threshold is the smallest floating point number represented by the processor. A person skilled in the art would recognize that the slope between the point and the first vertex could be used in place of the slope between the point and the second vertex without adding or detracting from the usefulness of the above equation.

In decision step 1510, the present invention evaluates the above equation to determine whether the calculated difference is less than the threshold. If the calculated difference is less the threshold, then the point lies on the line segment between the two vertices as shown in a step 1512. Otherwise, if the calculated difference is greater than the threshold, the point does not lie on the line segment between the two vertices. This completes the processing performed to determine whether a point lies on a line segment between two vertices.

Step 1512 and 1514 indicate, respectively, whether or not a point lies on a line segment between two vertices. This indication allows the decision block 910 to direct the flow of the processing.

Figure 16:
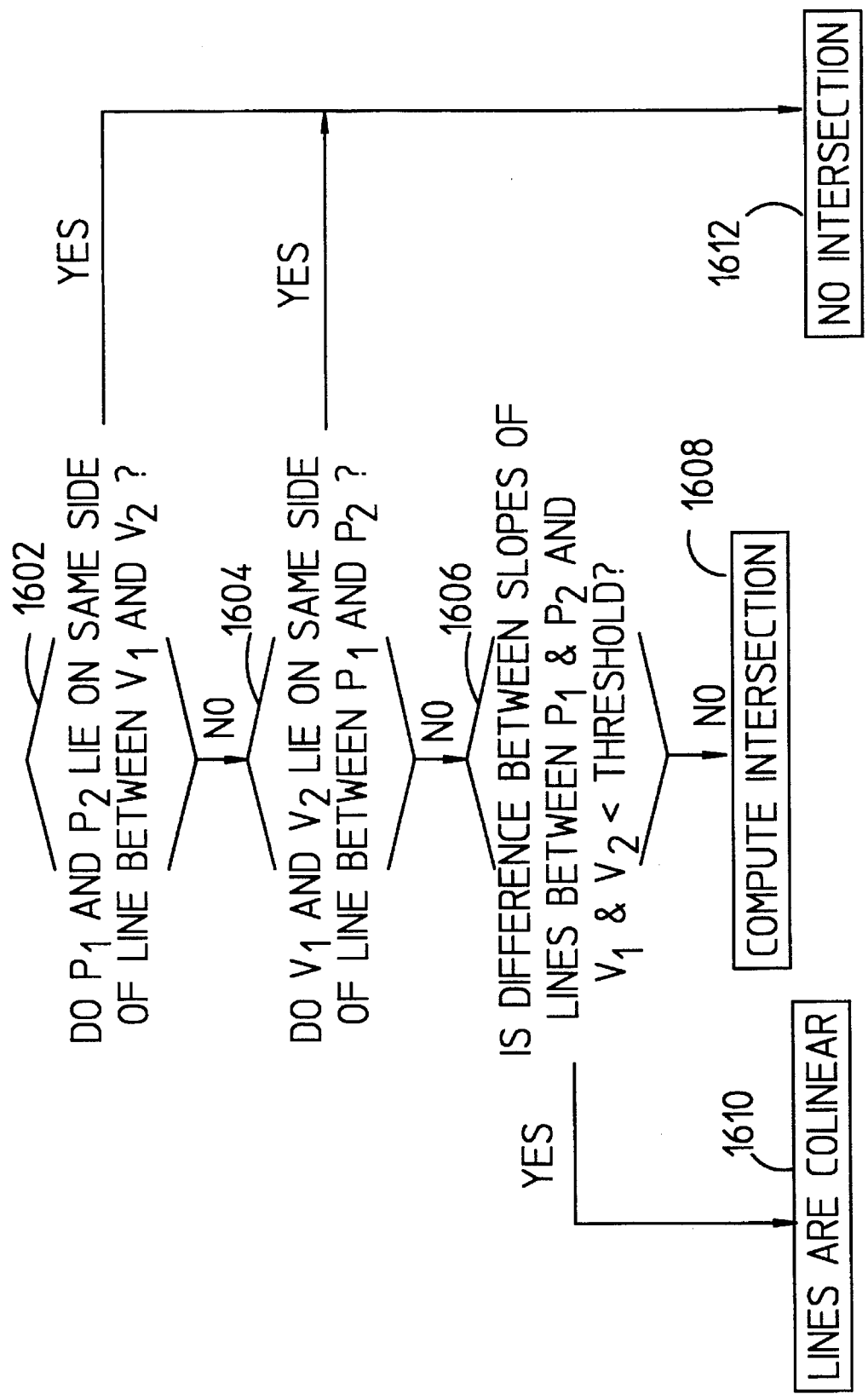
FIG. 16 is flow diagram illustrating the processing performed when line segment 308 and a line segment between the present and next vertices are checked for an intersection.

FIG. 16 is a flowchart illustrating the processing performed to determine whether a line segment between two points, $P_1$ and $P_2$, and a line segment between two vertices, $V_1$ and $V_2$ intersect. In a decision step 1602, the present invention determines whether $P_1$ and $P_2$ lie on the same side of the line segment between $V_1$ and $V_2$. If $P_1$ and $P_2$ do lie on the same side of the line segment between $V_1$ and $V_2$, then no intersection exists between the two line segments as output in a step 1612. Otherwise processing continues at a decision step 1604.

In decision step 1604, the present invention determines whether $V_1$ and $V_2$ lie on the same side of the line segment between $P_1$ and $P_2$. If $V_1$ and $V_2$ do lie on the same side of the line segment between $P_1$ and $P_2$, then no intersection exists between the two line segments as output in step 1612.

In decision step 1606, the present invention compares the slope of the line segment between $V_1$ and $V_2$ to the slope of the line segment between $P_1$ and $P_2$. Again, the direct slope comparison is manipulated to result in a calculated difference compared against a threshold as:

$$|[(V_2.y-V_1.y)*(P_2.x-P_2.x)]-[(P_2.y-P_1.y)*(V_2.x-V_1.x)]|<\epsilon.$$

If this calculated difference is less than the threshold, then the slopes are the same and the line segments are colinear as output in a step 1610. If the calculated difference is greater that the threshold, then the slopes are not the same. In this case processing continues at a step 1608, where the present invention computes an intersection point according to methods well known in the art. This completes the processing performed to determine whether an intersection between two line segments exists.

Figure 17:
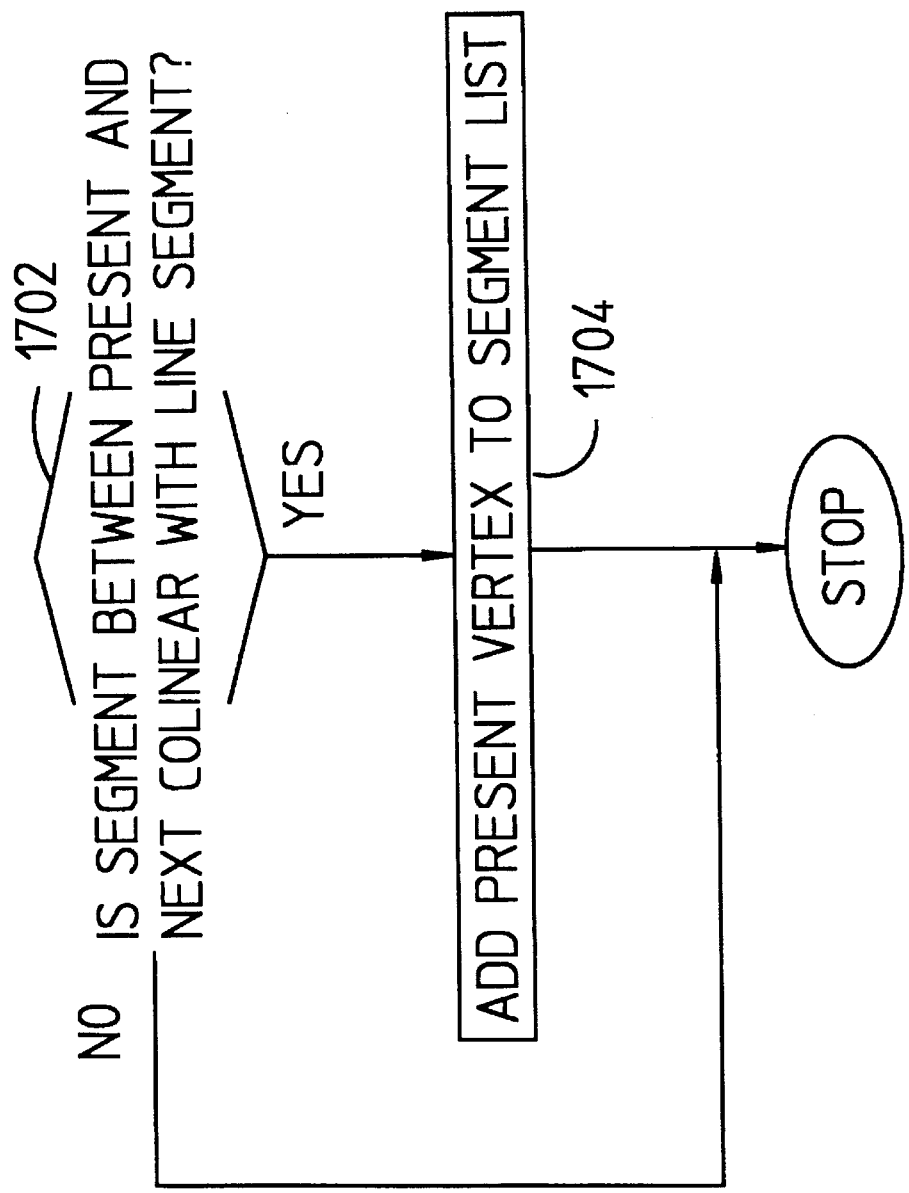
FIG. 17 is flow diagram illustrating the processing performed by step 706 in greater detail.

FIG. 17 is a flowchart illustrating the processing performed by step 706 when a pending intersection is checked to determine if it should be added to the segment list. In a decision step 1702, the present invention determines if the line segment between the present vertex and the next vertex is colinear with line segment 308. If the line segment is colinear with line segment 308, then the present invention adds the present vertex to the segment list in a step 1704 and processing of the pending intersection is completed. Otherwise, there is no pending intersection and processing is completed.

Figure 1A:
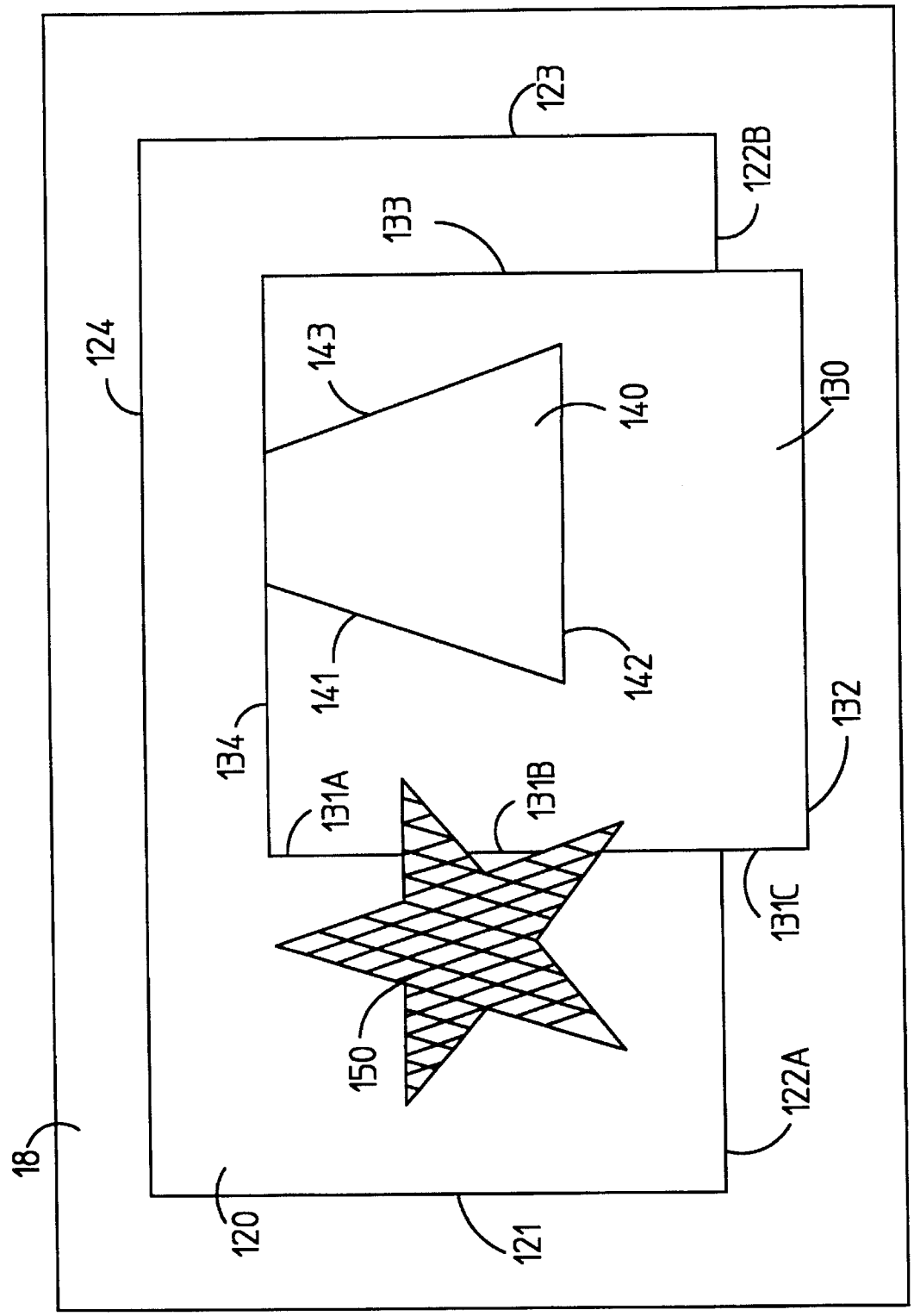
FIG. 1A is a computer graphics display showing an example of clipping line segments against polygons.
Figure 1B:
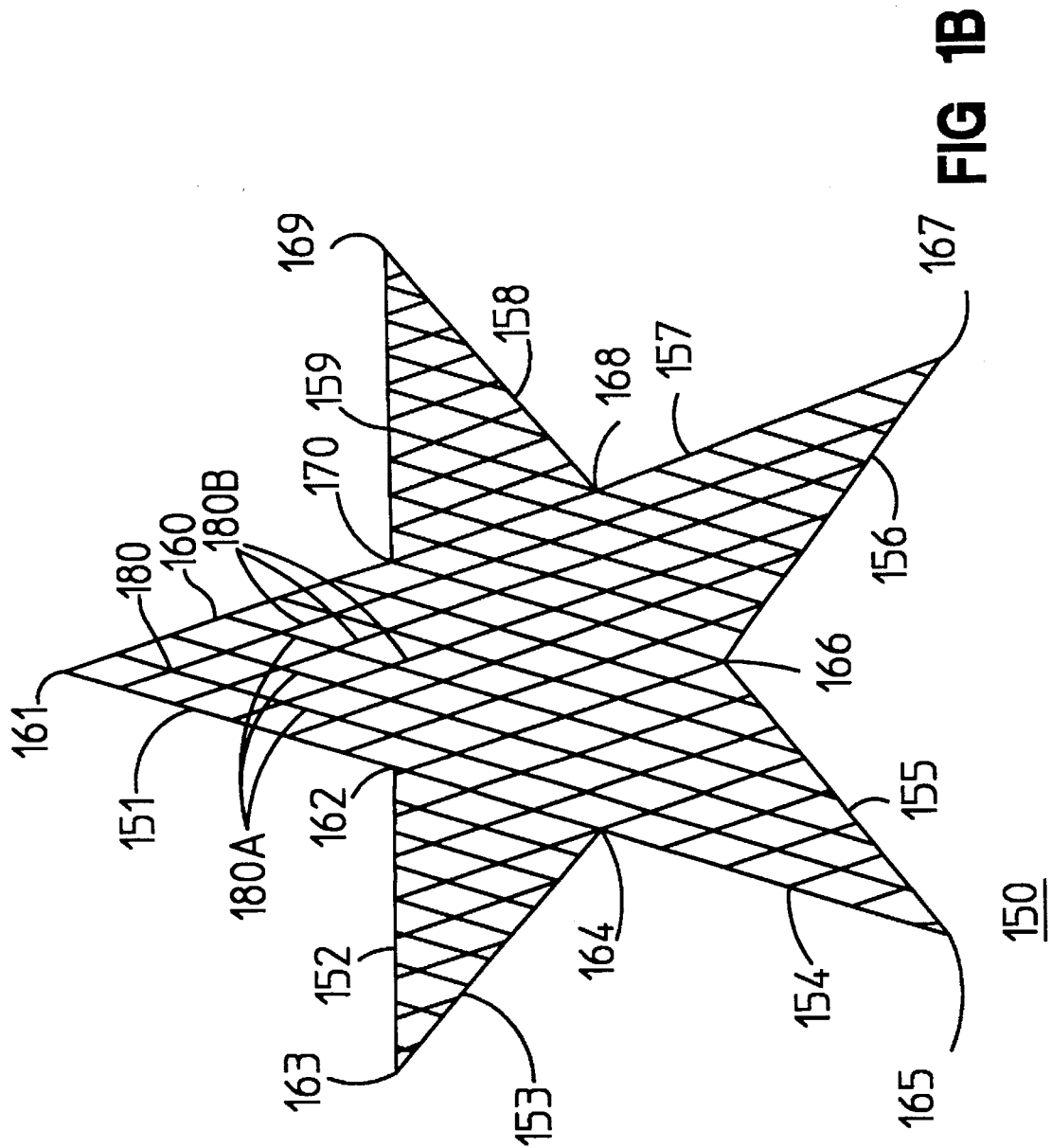
FIG. 1B is an enlarged view of a polygon shown in FIG. 1A.

The preceding embodiment handles clipping a single line segment 308 against a polygon 310. However, the preceding embodiment can be adapted to handle multiple line segments such as parallel line segments 180A or 180B (as shown in FIG. 1B). In these cases, only one rotation is necessary to align all parallel line segments with y-axis 206. In this embodiment, a rotation is performed on polygon 310 and each parallel line segment 180A (or, alternately, 180B) collectively. Then, each parallel line segment 180A is clipped against the interior of polygon 310. After each parallel line segment 180A has been clipped, then each is rotated back to its original orientation. This embodiment can be extended to cover cross-hatch pattern 180 as well by repeating the steps used to clip parallel line segment 180A to clip parallel line segment 180B as well. These embodiments save rotating polygon 310 for each independent parallel line segment 180A. Instead, polygon 310 is rotated once for the group of parallel line segment 180A.

Another embodiment of the present invention is used to determine if a point lies inside a polygon. In this embodiment, the test point becomes $U_1$, while $U_2$ is chosen such that $U_2.x$ is equal to $U_1.x$ and $U_2.y$ is set to infinity (i.e., the largest floating point number represented in the system). The present invention is then used to determine the number of intersections of the infinite line segment with the polygon. If the number of intersections is even, the point lies outside the polygon. If the number of intersections is odd, the point lies inside the polygon.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for clipping a line segment against a polygon using floating point operations comprising the steps of:
   (a) rotating the line segment and the polygon located at a first position with respect to a first coordinate frame to obtain a rotated line segment and a rotated polygon located at a second position, said first coordinate frame includes at least two axes and used to represent a location and an orientation of the line segment and the polygon;
   (b) clipping said rotated line segment against said rotated polygon; and
   (c) unrotating said rotated clipped line segment with respect to said first coordinate frame to said first position.

2. The method of claim 1, wherein said step of rotating comprises the steps of:
   1) determining an angle of the line segment with respect to an axis of said first coordinate frame; and
   2) using said angle to rotate the line segment and the polygon so that said rotated line segment is parallel to one of said axes in said first coordinate frame.

3. The method of claim 1, wherein said step of rotating comprises the steps of:
   1) choosing a second coordinate frame having at least two axes such that one of said axes of said second coordinate frame is parallel to the line segment; and
   2) performing a coordinate transformation on the line segment and the polygon represented in said first coordinate frame to obtain a representation of the line segment and the polygon in said second coordinate frame.

4. The method of claim 1, wherein the polygon is a concave polygon.

5. A method for clipping a plurality of parallel line segments against a polygon using floating point operations comprising the steps of:
   (a) rotating the plurality of parallel line segments and the polygon located at a first position with respect to a first coordinate frame to obtain a plurality of rotated line segments and a rotated polygon located at a second position, said first coordinate frame includes at least two axes and used to represent a location and an orientation of the plurality of line segments and the polygon;
   (b) clipping said plurality of rotated line segments against said rotated polygon; and
   (c) unrotating said plurality of rotated clipped line segments with respect to said first coordinate frame to said first position.

6. The method of claim 5, wherein said step of rotating comprises the steps of:
   1) determining an angle of one of the plurality of parallel line segments with respect to an axis of said first coordinate frame; and
   2) using said angle to rotate the plurality of parallel line segments and the polygon so that said plurality of rotated parallel line segments are parallel to one of said axes in said first coordinate frame.

7. A system for displaying a line segment clipped against a polygon comprising:
   (a) at least one computer processor for processing data associated with the line segment and the polygon;
   (b) at least one memory unit for storing data associated with the line segment and the polygon; and
   (c) clipping means for clipping the line segment against the polygon using floating point operations comprising:
      1) means for rotating the line segment and the polygon located at a first position with respect to a first coordinate frame to obtain a rotated line segment and a rotated polygon located at a second position, said first coordinate frame includes at least two axes and used to represent a location and an orientation of the line segment and the polygon;
      2) means for clipping said rotated line segment against said rotated polygon; and
      3) means for unrotating said rotated clipped line segment with respect to said first coordinate frame to said first position; and
   (d) a graphics display device for displaying the line segment and the polygon.

8. The system of claim 7, wherein said means for rotating comprises:
   (a) means for determining an angle of the line segment with respect to an axis of said first coordinate frame; and
   (b) means for using said angle to rotate the line segment and the polygon so that said rotated line segment is parallel to one of said axes in said first coordinate frame.

9. The system of claim 7, wherein said means for rotating comprises:
   (a) means for choosing a second coordinate frame having at least two axes such that one of said axes of said second coordinate frame is parallel to the line segment; and
   (b) means for performing a coordinate transformation on the line segment and the polygon represented in said first coordinate frame to obtain a representation of the line segment and the polygon in said second coordinate frame.

* * * * *